United States Patent [19]

Suzuki et al.

[11] Patent Number: 5,398,117
[45] Date of Patent: Mar. 14, 1995

[54] IMAGE READING APPARATUS

[75] Inventors: Akio Suzuki, Tokyo; Hiroyuki Tsuji, Yokohama, both of Japan

[73] Assignee: Canon Kabushiki Kaisha, Tokyo, Japan

[21] Appl. No.: 266,317

[22] Filed: Jun. 27, 1994

Related U.S. Application Data

[63] Continuation of Ser. No. 973,952, Nov. 9, 1992, abandoned.

[30] Foreign Application Priority Data

Nov. 14, 1991 [JP] Japan ................................. 3-326495
Aug. 19, 1992 [JP] Japan ................................. 4-242754

[51] Int. Cl.$^6$ ............................................. H04N 1/393
[52] U.S. Cl. ..................................... 358/451; 382/47
[58] Field of Search ............... 358/401, 448, 451, 452, 358/474, 444, 404; 382/47; 395/102, 116

[56] References Cited

U.S. PATENT DOCUMENTS

| | | | |
|---|---|---|---|
| 4,833,544 | 5/1989 | Sato et al. | 358/451 |
| 4,999,717 | 3/1991 | Nagashima | 358/448 |
| 5,101,282 | 3/1992 | Honma | 358/451 |

FOREIGN PATENT DOCUMENTS

| | | | |
|---|---|---|---|
| 0173099 | 3/1986 | European Pat. Off. | H04N 1/393 |
| 0267805A2 | 5/1988 | European Pat. Off. | H04N 1/40 |
| 2610158 | 7/1988 | France | H04N 1/393 |
| 2226472 | 6/1990 | United Kingdom | H04N 1/393 |

Primary Examiner—Edward L. Coles, Sr.
Assistant Examiner—Jerome Grant, II
Attorney, Agent, or Firm—Fitzpatrick, Cella Harper & Scinto

[57] ABSTRACT

An image reading apparatus for converting an image on an original into a first image signal by a reading unit and for converting the first image signal into a second image signal comprises: an input unit to set a zoom ratio; a driving motor to drive the reading unit so as to generate the first image signal indicative of the first image, in which the first image is an image obtained by zooming the original at a first zoom ratio; and a converter to convert the first image signal generated from the reading unit into the second image signal indicative of the second image, in which the second image is an image obtained by zooming the first image at a second zoom ratio according to the first zoom ratio and the zoom ratio set by the input unit.

19 Claims, 19 Drawing Sheets

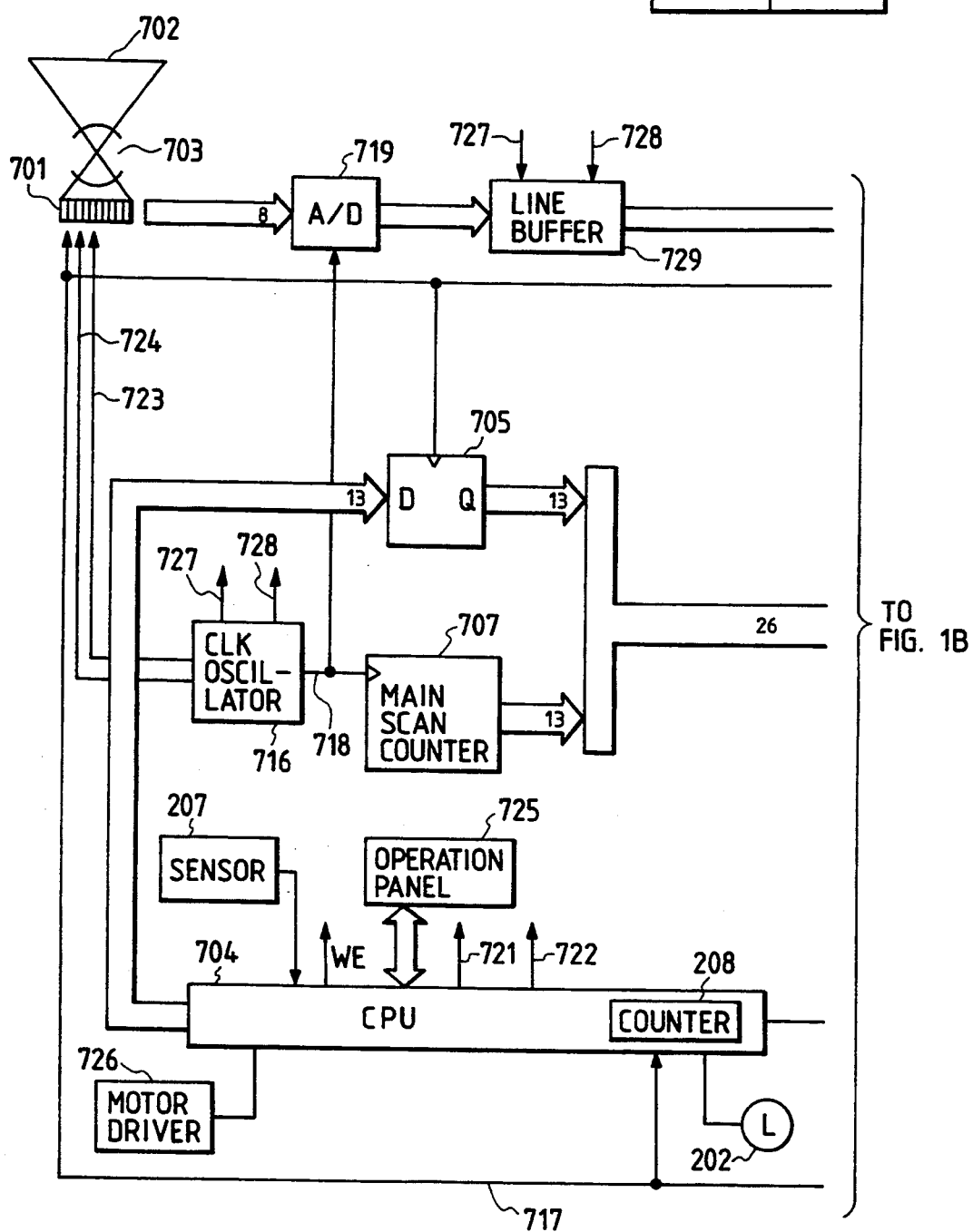

IMAGE READING APPARATUS

This application is a continuation of application Ser. No. 07/973,952, filed Nov. 9, 1992, which is now abandoned.

BACKGROUND OF THE INVENTION

1. Field of the Invention

The invention relates to an image reading apparatus for converting an original put on an original supporting plate into an image signal and for zoom processing the image signal.

2. Related Background Art

Hitherto, an image processing apparatus such as a digital color copying machine or the like has widely been known.

In such an image processing apparatus, a light is illuminated to an original by moving an optical system, the reflected light is read by a photoelectric converting device such as a CCD or the like, and various processes are performed on the resultant electric signal, so that an image process such as enlargement, reduction, or the like can be performed.

On the other hand, a 3-line sensor is frequently used as a CCD of the reading system. In the 3-line sensor, the light components separated into R (red), G (green), and B (blue) are photoelectrically converted every line. For instance, when the image of the original is red, the signal of only the R sensor is generated. In case of the black and white monochrome image, the signal of almost the same level is generated from each of the R, G, and B sensors. Each line device is arranged in parallel with the main scanning direction perpendicular to the moving direction of the optical system.

In the above zooming process for enlargement or reduction, the zoom in the main scanning direction is realized by interpolating each pixel (in the enlarging mode) or thinning out each pixel (in the reducing mode) by using the signal read by the CCD.

The zoom in the subscanning direction (line direction) as a moving direction of the optical system is realized by slowly (in the enlarging mode) or quickly (in the reducing mode) scanning the reading optical system for the original and thereby changing a scanning line width on the original corresponding to one line. According to such a method, a control speed can be finely adjusted within a control range of a drive motor of the optical system and a relatively stable image signal can be obtained.

By using a page memory, on the other hand, the zoom in the subscanning direction can also be performed by using a circuit similar to the zooming circuit in the main scanning direction. In this instance, the zoom is realized by storing the image signal while thinning out the pixels (in the reducing mode) or by interpolating the pixels while reading out the image from the memory (in the enlarging mode) for the page memory. By using such a method, the scanning speed of the optical system can be always made constant.

According to the zooming method of controlling the scanning speed of the optical system as mentioned above, however, there is an allowable range in a rotational speed of the drive motor of the optical system. For instance, since there is a limit in the high speed rotation which is necessary in the reducing mode from a viewpoint of the characteristics of the motor, a reduction ratio also has a limit.

On the contrary, in case of the low speed rotation which is necessary in the enlarging mode, the stability of the vibration or the like of the optical system causes a problem. With respect to the vibration of the optical system, since the output levels of the line devices of the CCD are almost equal for a monochrome original, the vibration components of every line are set off to a certain degree and the optical system becomes stable. However, since the component of a certain one line device is directly generated for a color original, the vibration components are generated as noises.

Even in the allowable range of the rotational speed of the motor, the motor or the casing to fix the motor has a resonance frequency, so that a vibration occurs at a special frequency or rotational speed and the optical system becomes unstable.

In case of using the method of zooming by using the page memory, in dependence on a magnification for zooming, when the arithmetic operating process such as interpolation or thinning-out is executed, a dropout or error of the output signal occurs. Therefore, a very complicated circuit construction is needed to raise the precision.

SUMMARY OF THE INVENTION

It is an object of the invention to improve an image reading apparatus for converting an image of an original into an image signal by a reading unit and for executing a zooming process to the image signal.

Another object of the invention is to obtain a zoom image of a high quality.

Still another object of the invention is to widen a zoom ratio which can be realized.

Further another object of the invention is to obtain a zoom image of a high quality by executing a preferable zooming process in accordance with whether an original to be read is a color original or a monochrome original.

Further another object of the invention is to allow a motor for driving a reading unit to be rotated at a frequency other than a resonance frequency in the zoom reading mode.

Further another object of the invention is that the first zoom in the subscanning direction is performed by controlling a driving speed of a line sensor, the second zoom in the subscanning direction is executed by an image signal process, and the first and second zooms are combined, thereby realizing a desired zoom ratio in the subscanning direction.

The above and other objects and features of the present invention will become apparent from the following detailed description and the appended claims with reference to the accompanying drawings.

BRIEF DESCRIPTION OF THE DRAWINGS

FIG. 1, which contains FIG. 1A & 1B, is a block diagram showing the first embodiment of the invention;

DETAILED DESCRIPTION OF THE PREFERRED EMBODIMENTS

Figure 1B:
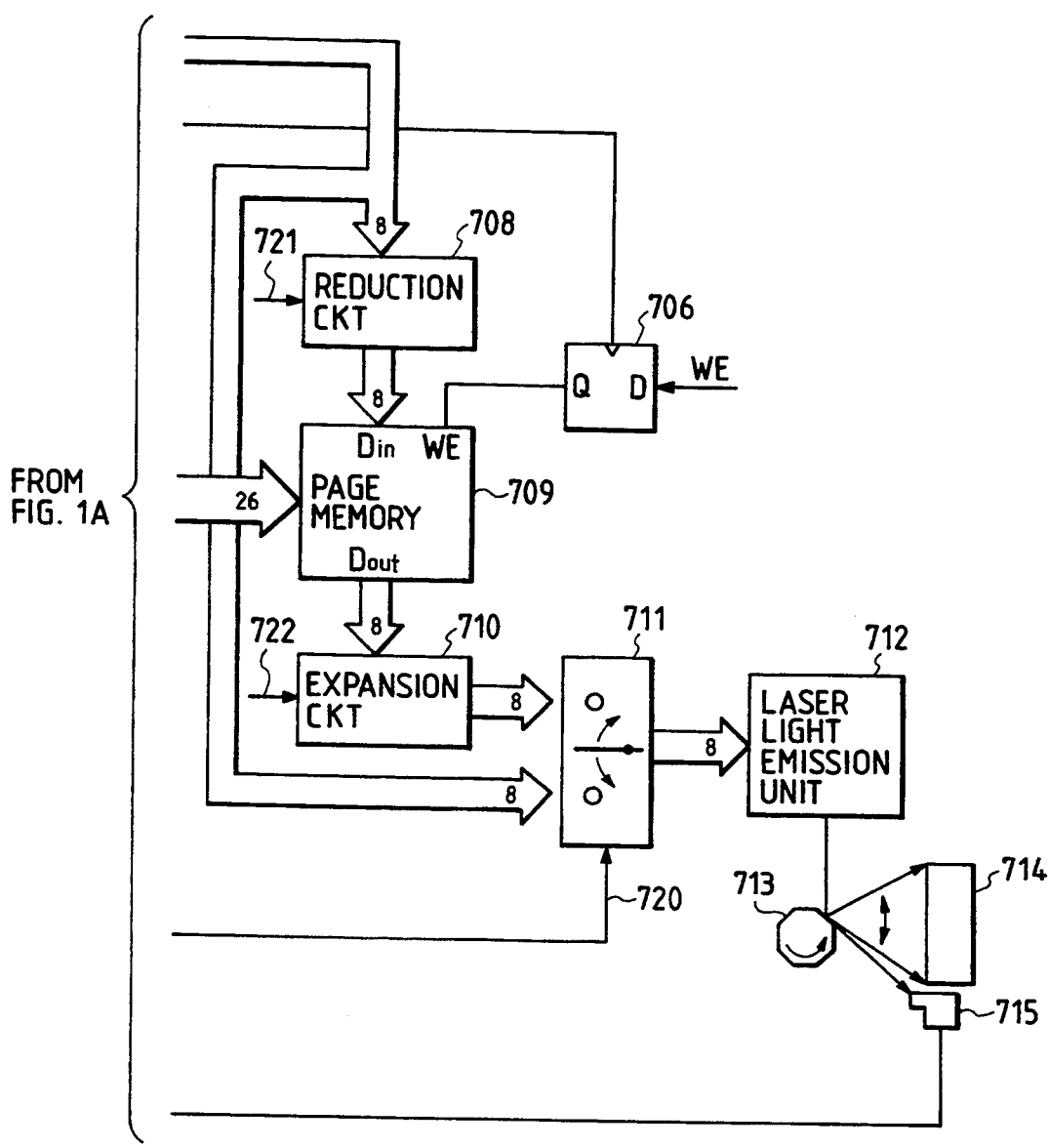

FIGS. 1A and 1B are a block diagrams showing the first embodiment of the invention.

An image processing apparatus of the embodiment comprises: a CCD (charge coupled device) line sensor 701 as a photoelectric converting device to read an image on an original 702 through a lens 703; a CPU (central processing unit) 704 to control the whole apparatus; D-type flip-flops 705 and 706 for horizontal synchronization; a main scan counter 707 to count pixel clocks 718; an operation unit 725 including up/down keys to set a magnification; an image edge sensor 207; and a subscan counter 208.

The image processing apparatus also comprises: a page memory 709 to store image data for zooming in the subscanning direction; a reduction circuit 708 to reduce an image in the subscanning direction at a predetermined magnification by using the page memory 709 on the basis of a reduction circuit on/off signal 721 from the CPU 704; an expansion circuit 710 to expand an image in the subscanning direction at a predetermined magnification by using the page memory 709 on the basis of an expansion circuit on/off signal 722 from the CPU 704; and a mechanical zoom/memory zoom switching unit 711 for switching a zooming method on the basis of a mechanical zoom/memory zoom selection signal 720 from the CPU 704.

The image processing apparatus further comprises: a laser light emission unit 712 having a semiconductor laser or the like; a polygon scanner 713 to perform the main scan by controlling the direction of a laser beam; a photo sensitive drum 714 on which an electrostatic latent image is formed by the laser beam; a photo diode 715 for generating a horizontal sync signal 717 when it receives the laser beam; a clock oscillator 716 to generate various kinds of clock signals such as pixel clocks 718 and the like; an A/D converter 719 to convert an analog image signal from the CCD line sensor 701 into a digital image signal; and a line buffer 729 to zoom in the main scanning direction.

In the embodiment, the expansion in the main scanning direction is executed by changing a frequency of a read clock 728 which is supplied from the clock oscillator 716 to the line buffer 729 in accordance with a zoom ratio from the operation unit 725. The reduction in the main scanning direction is executed by changing a frequency of a write clock 727 which is supplied from the clock oscillator 716 to the line buffer 729 in accordance with a zoom ratio from the operation unit.

Figure 2:
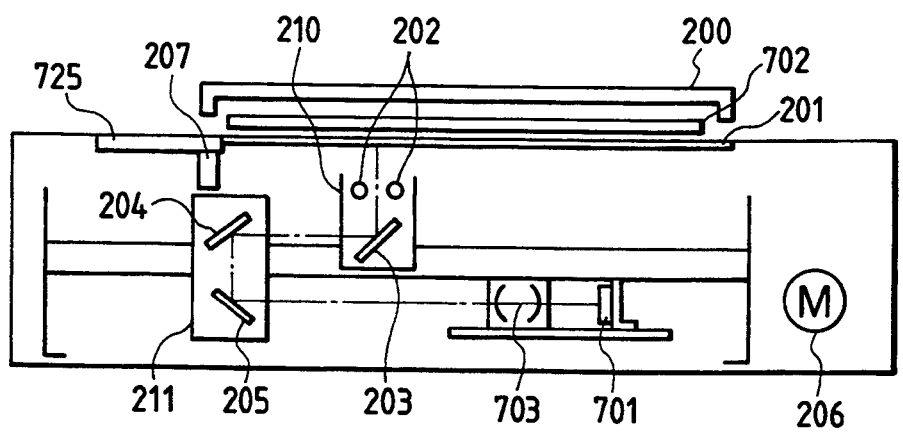
FIG. 2 is a cross sectional view showing a construction of an original reading unit in the first embodiment.

FIG. 2 is a cross sectional view showing a construction of an original reading unit in the image processing apparatus.

The original 702 put on an original supporting glass 201 is pressed by an original cover 200. An illumination light from a light source 202 is reflected by the surface of the original 702 and is reflected by mirrors 203, 204, and 205 and is formed as an image on the CCD line sensor 701 by the lens 703.

An optical unit 210 comprising the light source 202 and the mirror 203 and an optical unit 211 comprising the mirrors 204 and 205 are moved at relative speeds of 2:1. The optical units 210 and 211 are moved from the left to the right at a constant speed by a DC (direct current) servo motor 206 while performing a PLL (phase locked loop) control. The movement speed can be varied on a moving path in accordance with a zoom magnification. By setting the movement speed to a slow speed (in the expanding mode) or to a fast speed (in the reducing mode), the zoom in the subscanning direction in which the optical units 210 and 211 move is executed. To perform such a speed control of the optical units, the CPU 704 supplies clocks of a frequency according to the zoom magnification to a motor driver 726 to PLL control the motor 206.

In FIGS. 1A & 1B, the laser beam emitted from the laser light emission unit 712 scans the surface of the photo sensitive drum 714 by the polygon scanner 713 in the axial direction of the drum 714. In this instance, the passage of the laser beam is detected by the photo diode 715 arranged on an extension line of the scanning line so as to be located near the drum 714, so that the horizontal sync signal 717 is formed.

The CCD line sensor 701 generates an image signal of one line synchronously with the horizontal sync signal 717 in accordance with double-phase clocks 723 and 724 from the clock oscillator 716. The A/D converter 719 converts the image signal into the 8-bit digital image signal of every pixel synchronized with the image clocks 718.

The digital image signal is divided into the signal which is directly supplied as a mechanical zoom image signal to the mechanical zoom/memory zoom switching unit 711 and the signal which is supplied as a memory zoom image signal to the switching unit 711 through the reduction circuit 708, page memory 709, and expansion circuit 710.

In the expansion in the moving direction (subscanning direction) of the optical units 210 and 211, the mechanical zoom can be performed in case of the enlargement magnification which can be realized at a movement speed which is equal to or higher than the minimum value $V_{min}$ of the movement speed of the optical unit 210. Therefore, the CPU 704 switches the mechanical zoom/memory zoom switching unit 711 to the mechanical zoom side by the mechanical zoom/memory zoom selection signal 720. The CPU 704 supplies clocks of a frequency according to the magnification to the motor driver 726 so that the optical units 210 and 211 move at a speed according to the magnification supplied from the operation unit 725. The image signal generated from the CCD line sensor 701 is directly sent to the laser light emission unit 712 without passing through the page memory 709 synchronously with the horizontal sync signal 717 from the photodiode 715.

In case of an enlargement magnification which can be realized only at a movement speed lower than the minimum value $V_{min}$ of the movement speed of the optical unit 210, the image is enlarged by using the page memory 709.

Figure 3:
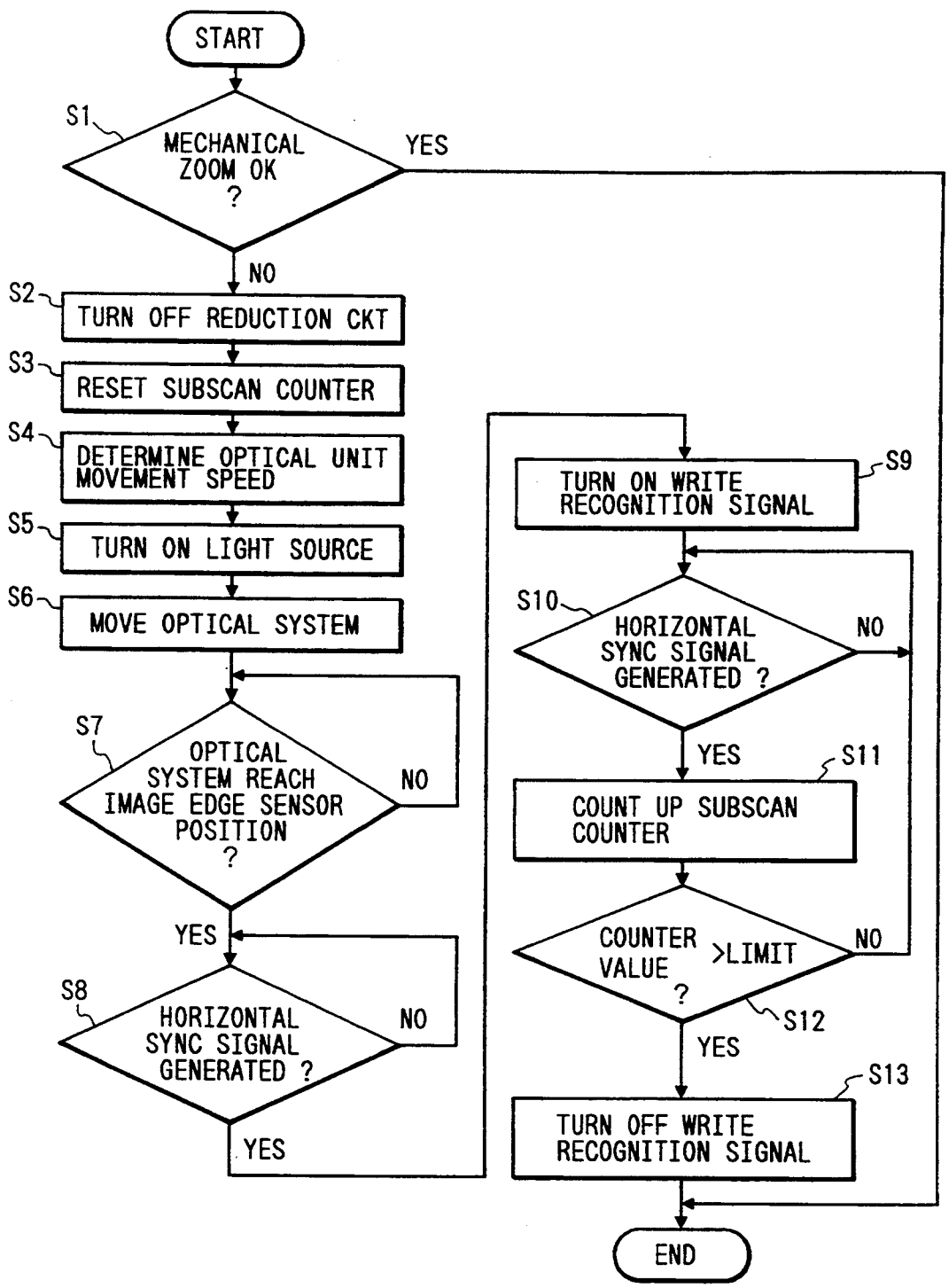
FIG. 3 is a flowchart showing the operation in the image enlarging mode in the first embodiment.

FIG. 3 is a flowchart showing the operation in the above case.

That is, in the case where the magnification supplied from the operation unit 725 is equal to or larger than a predetermined value, the CPU 704 determines that the mechanical zoom cannot be performed (step S1). The CPU 704 first turns off the reduction circuit 708 by the reduction circuit on/off signal 721 (S2). The subscan counter 208 is reset (S3). The CPU 704 subsequently decides the movement speed of the optical unit 211 to a proper value in accordance with the magnification designated from the operation unit 725 and the enlargement magnification set by the expansion circuit 710 (S4). Further, the polygon scanner 713 and the drum 714 are rotated and the light source 202 is lit on (S5). The movement of the optical units 210 and 211 is started (S6).

When the optical unit 210 which has been moved as mentioned above reaches the position of the image edge sensor 207 (S7), the image signal of the original read out by the CCD line sensor 701 line by line is converted into the 8-bit digital image signal by the A/D converter 719 every pixel synchronized with the pixel clocks 718 as mentioned above. When the image signal is read out from the line buffer 729, the expansion in the main scanning direction is executed. The expanded signal directly passes through the reduction circuit 708 in the OFF state and the apparatus waits until it is supplied to the page memory 709. The CPU 704 generates a write recognition signal WE to the D-type flip-flop 706.

When the passage of the laser beam is detected by the photo diode 715 and the horizontal sync signal 717 is formed (S8), the write recognition signal set in the D-type flip-flop 706 is generated from the flip-flop 706 by the CPU 704 (S9), thereby setting a state in which data can be written into the page memory 709.

In this state, the digital image signal of one line is written every pixel data into the address in the page memory 709 of 26 bits which are expressed by the main scan address of 13 bits from the main scan counter 707 to count up the pixel clocks 718 generated from the clock oscillator 716 and the subscan address of 13 bits from the CPU 704 to count the horizontal sync signal 717.

When the next horizontal sync signal 717 is supplied to the flip-flop 705 (S10), the subscan address which has been counted up is generated (S11). The address in the page memory 709 to store the digital image signal of the next line one is designated. When the CPU 704 writes all of the read-out data into the page memory 709 (S12), the write recognition signal WE is turned off (S13) and the writing operation into the page memory 709 is finished.

The data written in the page memory 709 as mentioned above becomes the input data to the expansion circuit 710. The expansion circuit 710 is turned on by the on/off signal 722 from the CPU 704. The expansion circuit 710 subsequently interpolates the data received every eight bits in the subscanning direction in accordance with the zoom ratio supplied from the operation unit 725 and the speed of the optical unit 211 and generates the interpolated data.

The switching unit 711 is switched to the memory zoom mode by the mechanical zoom/memory zoom selection signal 720 from the CPU 704. The data which has been interpolated in the subscanning direction by the expansion circuit 710 is sent to the laser light emission unit 712 every eight bits.

In the reduction mode in the moving direction (subscanning direction) of the optical units 210 and 211, the mechanical zoom can be performed at a reduction magnification which can be realized at a movement speed that is equal to or lower than the maximum value $V_{max}$ of the movement speed of the optical unit 210. Therefore, the CPU 704 switches the switching unit 711 to the mechanical zoom by the selection signal 720. The CPU 704 moves the optical units 210 and 211 at a speed according to the magnification supplied from the operation unit 725. The image signal generated from the CCD line sensor 701 synchronously with the horizontal sync signal from the photo diode 715 is directly sent to the laser light emission unit 712 without passing through the page memory 709.

On the other hand, at a reduction magnification which can be realized only when the movement speed is set to a speed higher than the maximum value $V_{max}$ of the movement speed of the optical unit 210, the image is reduced by using the page memory 709 in a manner similar to the case of the foregoing expansion.

Figure 4:
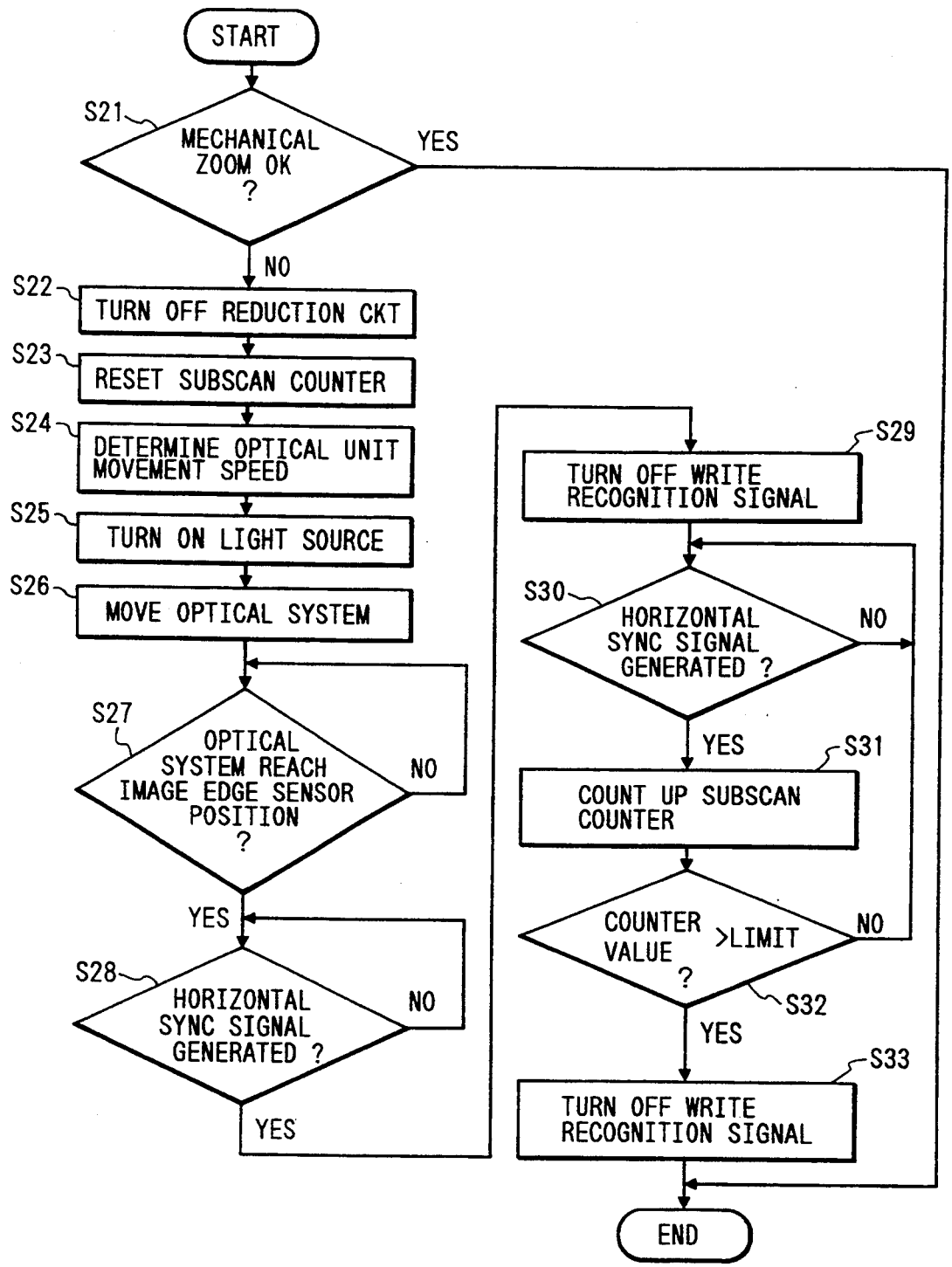
FIG. 4 is a flowchart showing the operation in the image reducing mode in the first embodiment.

FIG. 4 is a flowchart showing the operation in such a case.

That is, when the magnification supplied from the operation unit 725 is equal to or less than a predetermined value, the CPU 704 determines that the mechanical zoom cannot be performed (step S21). The reduction circuit 708 is first turned on by the reduction circuit on/off signal 721 (S22). The subscan counter 208 is reset (S23). Subsequently, the movement speed of the optical unit 211 is determined to a proper value in accordance with the magnification designated from the operation unit 725 and the reduction magnification by the reduction circuit 708 (S24). Further, the polygon scanner 713 and drum 714 are rotated and the light source 202 is lit on (S25). The movement of the optical system is started (S26).

When the optical unit 210 which has been moved as mentioned above reaches the position of the image edge sensor 207 (S27), the image signal of the original which has been read by the CCD line sensor 701 line by line is converted into the 8-bit digital image signal by the A/D converter 719 every pixel synchronized with the pixel clocks 718 as mentioned above. When the digital image signal is written into the line buffer 729, the image signal is reduced in the main scanning direction and supplied to the reduction circuit 708 in the ON state. The data is thinned out by the reduction circuit 708 in accordance with the zoom ratio supplied from the operation unit 725 and the speed of the optical unit 211. The apparatus waits until the signal is stored into the page memory 709. The CPU 704 generates the write recognition signal WE to the D-type flip-flop 706.

When the passage of the laser beam is detected by the photo diode 715 and the horizontal sync signal 717 is formed (S28), the write recognition signal set in the flip-flop 706 is generated from the flip-flop 706 by the CPU 704 (S29), thereby setting a state in which data can be written into the page memory 709.

In the above state, the digital image signal of one line is written every one pixel data into the address in the page memory 709 of 26 bits which is expressed by the main scan address of 13 bits from the main scan counter 707 to count up the pixel clocks 718 which are generated from the clock oscillator 716 and the subscan address of 13 bits from the CPU 704 to count the horizontal sync signals 717.

When the next horizontal sync signal 717 is supplied to the D-type flip-flop 705 (S30), the subscan address which has been counted up is generated (S31). The address in the page memory 709 to store the digital image signal of the next one line is designated. When the CPU 704 writes the whole read-out data into the page memory 709 (S32), the write recognition signal is turned off (S33) and the writing operation to the page memory 709 is finished.

The data written in the page memory 709 as mentioned above passes through the expansion circuit 710 which has been turned off by the expansion circuit on/off signal 722 from the CPU 704 and is sent to the laser light emission unit 712 every eight bits through the switching unit 711 which has been switched to the memory zoom by the selection signal 720 from the CPU 704.

Although the page memory 709 has been used in the above embodiment, a memory having a capacity of a few lines can be also used.

Although the latent image has been formed on the photo sensitive drum 714 by the laser beam in the above embodiment, for instance, the image can be also recorded onto a recording paper by driving an ink jet head. The image can be also preserved into a memory or can be also displayed by a display.

Figure 5:
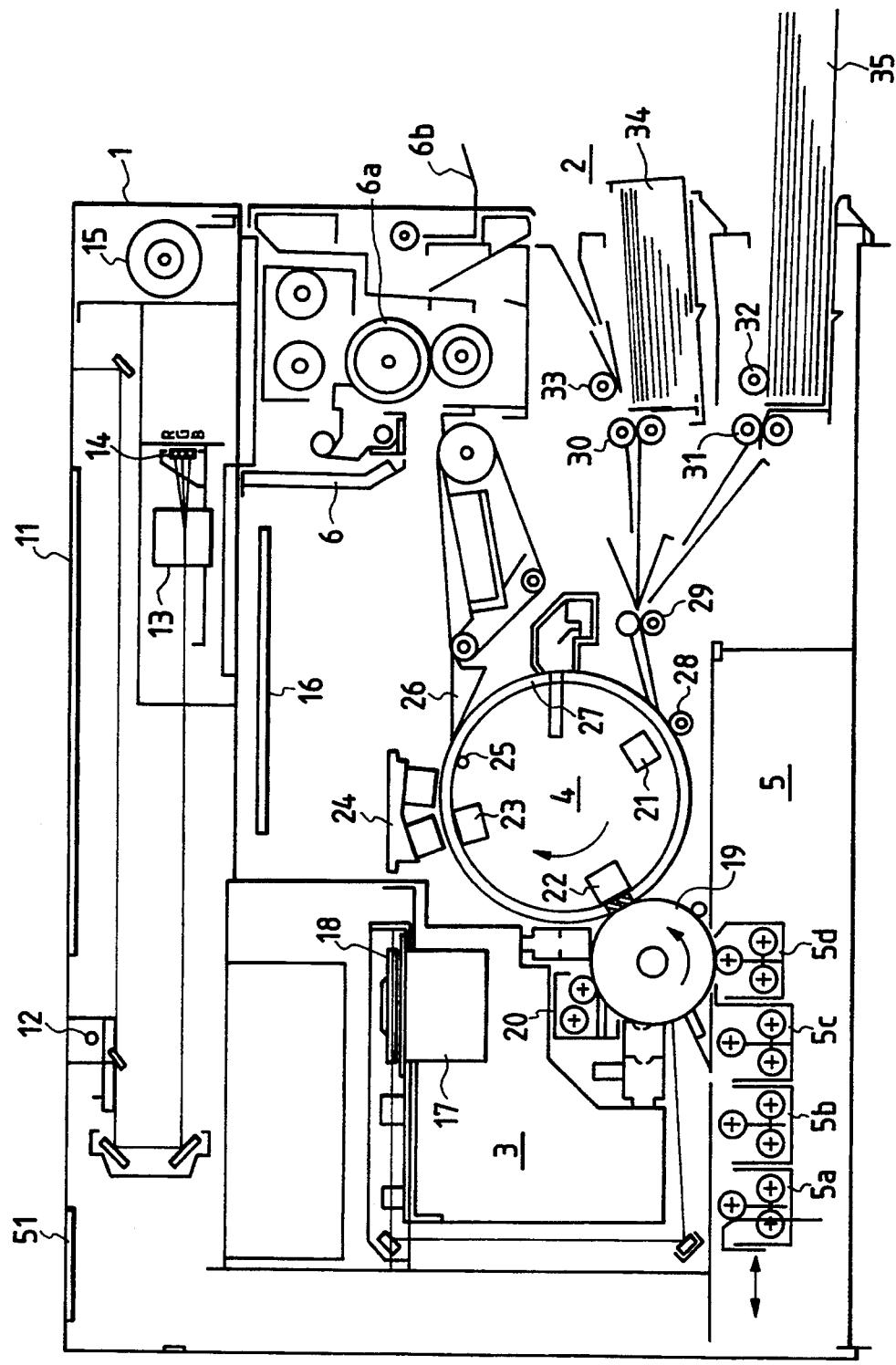
FIG. 5 is a cross sectional view showing a mechanical construction of a copying machine in the second embodiment of the invention.

FIG. 5 is a cross sectional view showing a structure of a full-color electrophotographic copying machine according to the second embodiment of the invention.

In FIG. 5, a reader unit 1 comprises: an original supporting plate (platen glass) 11; an original illuminating lamp 12; an image forming lens 13; an image pickup device 14; an optical reading drive motor 15; and the like. A CCD of three lines having three color filters of R, G, and B which are mutually adjacently arranged is used as an image pickup device 14. The light information of the same one line from the original is projected onto each of the R, G, and B line sensors.

The image of the original is read by an original scan unit at a constant speed which is determined by a preset copy magnification. The original scan unit is moved and scans integratedly with the original illuminating lamp 12 by the optical reading drive motor 15. The motor 15 is a DC servo motor which is PLL controlled. A movement speed can be varied within a range from 22.5 mm/sec to 360 mm/sec on the going path in accordance with the magnification and is always set to 800 mm/sec on the return path.

In the embodiment, in order to sequentially perform the recording of each development color of magenta, cyan, yellow, and black, the reading operation of the original image is executed a plurality of number of times in correspondence to the recording in each development color.

In case of using an image memory of a large capacity, it is sufficient to perform the reading operation only once.

An operation unit 51 is arranged around the original supporting plate (platen glass) 11. There are provided switches to set various kinds of modes regarding a copy sequence, a display to display, and a display lamp.

A recording paper feed unit 2 comprises feed rollers 30 and 31, pickup rollers 32 and 33, and the like. Paper cassettes 34 and 35 are attached to the recording paper feed unit 2. The feed unit 2 feeds a copy transfer paper in accordance with a drive command from a controller unit 16.

An image forming unit 3 comprises a scanner motor 17, a polygon mirror 18, a photo sensitive drum 19, and a cleaner unit 20. A color image signal read out by the image pickup device 14 is processed by the controller unit 16 and color separation image signals of magenta, cyan, yellow, and black are generated. On the basis of those color signals, a laser beam from a laser light source is formed as an image on the photo sensitive drum 19, thereby forming an electrostatic latent image of each color.

An image transfer unit 4 comprises an adsorption charging unit 21, a transfer charging unit 22, separation charging units 23 and 24, a separation pressing roller 25, a separating nail 26, a transfer drum 27, an adsorbing roller 28, a resist roller 29, and the like.

In the image transfer unit 4, the transfer paper fed to the position of the resist roller 29 by the feed rollers 30 and 31 is sent to the transfer drum 27 by the resist roller 29 at a timing when the image head position is synchronized with the photo sensitive drum 19. The transfer paper is electrostatically adsorbed to the transfer drum 27 by the adsorbing roller 28 and the adsorption charging unit 21 which function as opposite electrodes. The transfer charging unit 22 transfers each of the color development agents developed on the photo sensitive drum 19 onto the transfer paper.

A developing section 5 is constructed by development units 5a to 5d and the like and is reciprocated in the directions shown by arrows by a motor, which will be explained hereinlater, and a development sleeve is moved to the developing position of the photo sensitive drum 19. Development agents of black, yellow, cyan, and magenta are contained in the development units 5a to 5d in accordance with this order.

The electrostatic latent images of the photo sensitive drum 19 are visualized by the development units 5a to 5d by using predetermined development agents. First, the electrostatic latent image of magenta on the photo sensitive drum 19 is developed by using the development unit 5d of magenta. The magenta toner image is transferred to the transfer paper wound around the surface of the transfer drum 27.

Subsequently, the electrostatic latent image of cyan on the photo sensitive drum 19 is developed by using the cyan development unit 5c. The cyan toner image is transferred onto the magenta toner image on the transfer paper wound around the surface of the copy transfer drum 27. Similarly, the toner images developed by the yellow and black development units are sequentially transferred so as to overlap the transfer paper on the copy transfer drum.

A fixing unit 6 fixes the toners of black, yellow, cyan, and magenta onto the transfer paper by a fixing roller 6a. The fixed transfer paper is discharged onto a tray 6b.

The invention is not limited to an apparatus for recording by using the foregoing electrophotographic printer but can be also applied to an apparatus for recording by using an ink jet printer. The copy image can be also preserved in a memory or displayed by a display.

Figures 6, 6A:
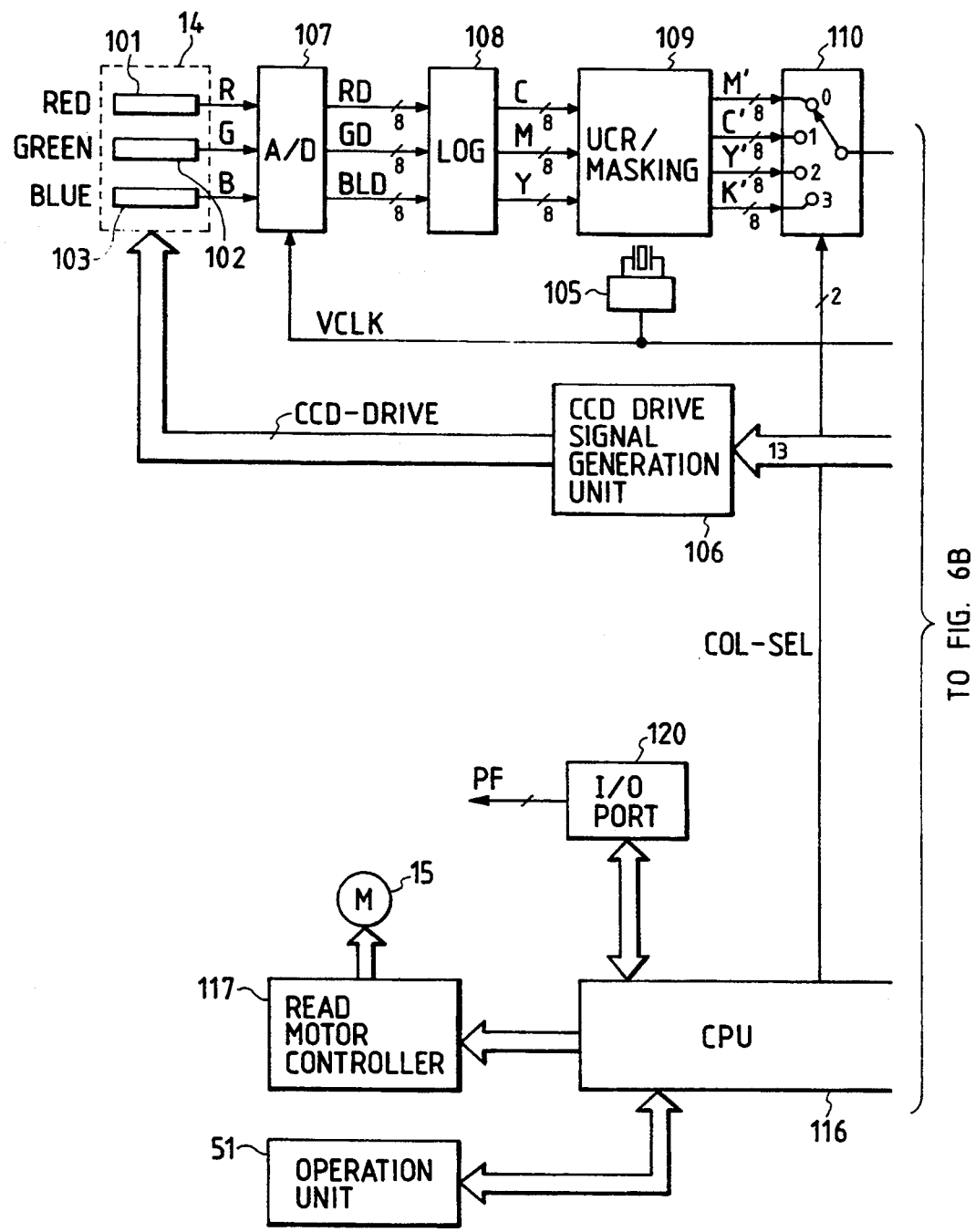
FIG. 6, which contains
FIGS. 6A–6C, is a block diagram showing a construction of a control circuit in the second embodiment.
Figure 6B:
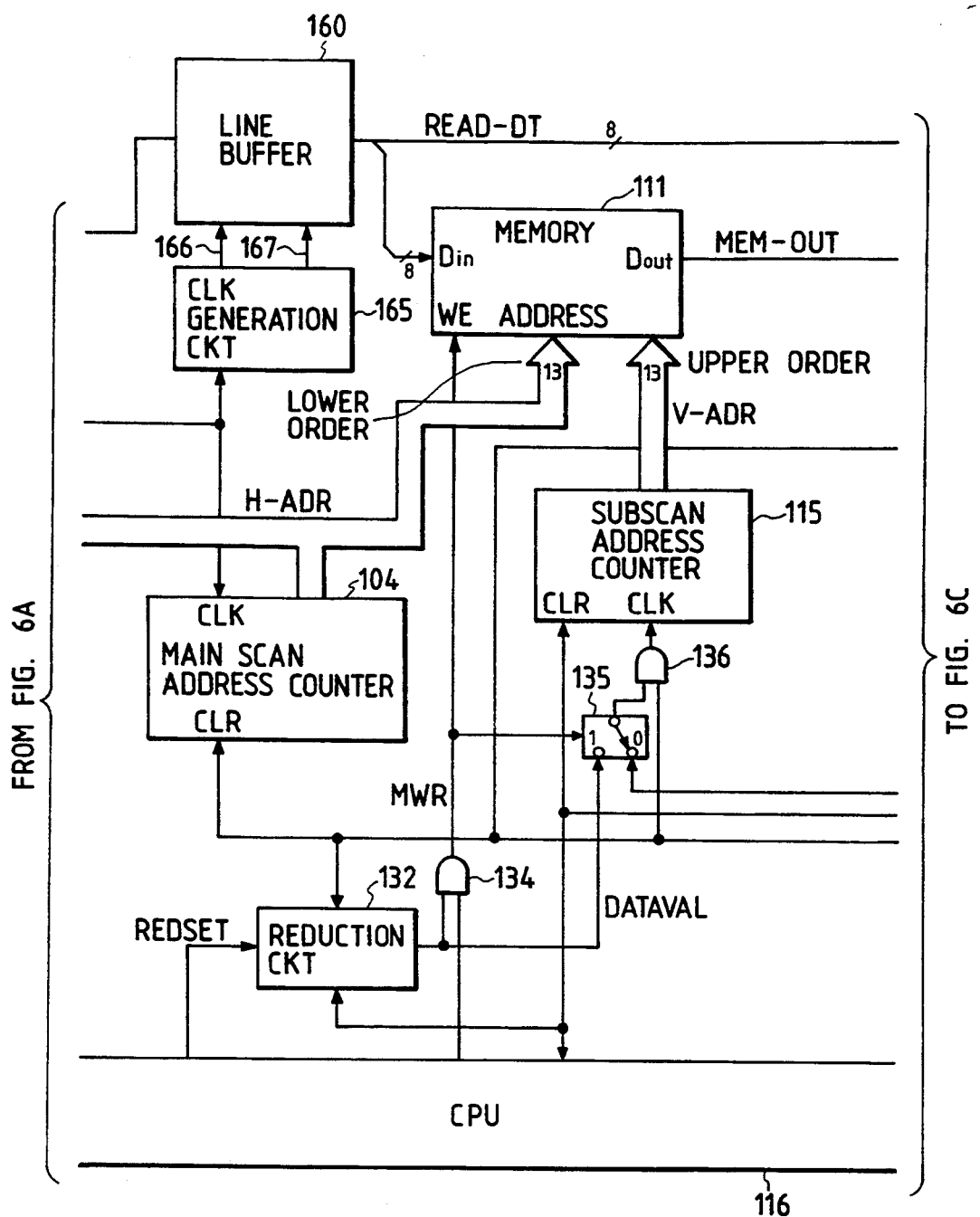
Figure 6C:
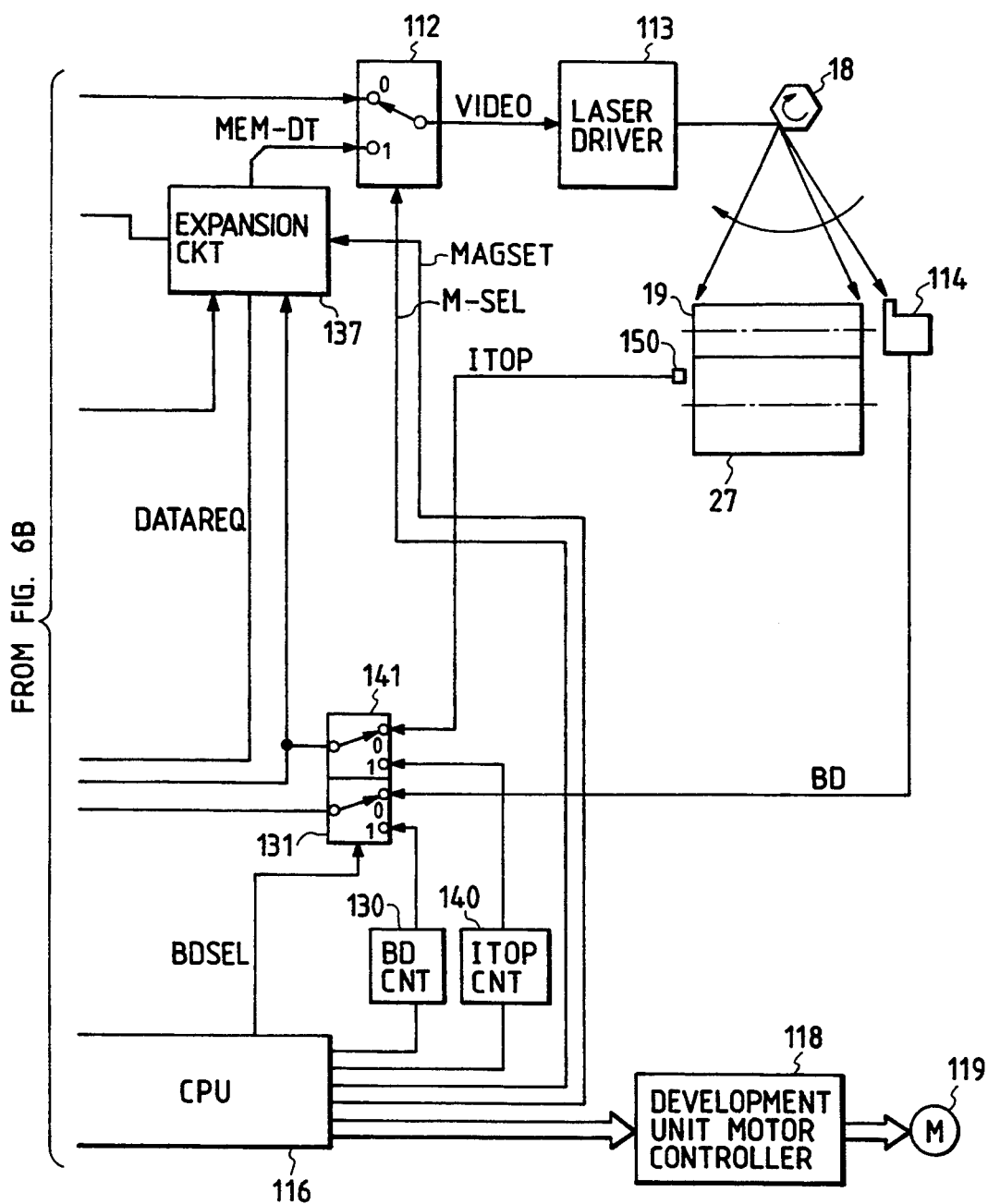

FIGS. 6A, 6B & 6C are block diagrams showing the controller unit 16 and its peripheral sections to be controlled.

The image pickup device 14 is constructed by CCDs 101, 102, and 103 of three lines of red, green, and blue and color separates the light information of one line from the original and generates electric signals of R, G, and B by a resolution of 400 d.p.i. (dots/inch). In the embodiment, since the image signal is read out while setting a length of one line to up to 297 mm (A4 size in the vertical direction), the images of 4677 pixels of one line of each of the colors of R, G, and B are generated from the CCDs 101, 102, and 103.

A main scan address counter 104 is cleared every line by a BD signal as a sync signal of the laser recording of every line to the photo sensitive drum 19. The counter 104 counts the number of VCLK signals from a pixel clock generator 105 and generates a count output H-ADR corresponding to each pixel of the image information of one line which is read out from the image pickup device 14. The count output H-ADR is counted up from 0 to 5000 and the image signal of one line from the image pickup device 14 can be sufficiently read out.

A CCD drive signal generation unit 106 decodes the count output H-ADR and generates a CCD-DRIVE signal as a set pulse or a transfer clock. Thus, the color separation signals of R, G, and B for the same pixel are sequentially generated from the CCD synchronously with the VCLK clocks.

An A/D converter 107 converts each of the image signals of red, green, and blue into the 8-bit digital signal. A light amount/density conversion unit 108 converts the 8-bit light amount signals of red, green, and blue into the 8-bit density signals of cyan (C), magenta (M), and yellow (Y) by the logarithm conversion.

An UCR/masking processing unit 109 extracts the density signal of black from the density signals of three colors of C, M, and Y by a well-known UCR process (undercolor removing process) and executes a well-known masking arithmetic operation to eliminate the color turbidity of the development agent corresponding to each density signal.

From density signals of M', C', Y', and K' generated as mentioned above, the color signal corresponding to the development agent which is used at present is selected by a selector 110. A COL-SEL signal is a 2-bit signal which is generated from a CPU 116 for color selection. When the COL-SEL signal is equal to 0, the M' signal is generated. When the COL-SEL signal is equal to 1, the C' signal is generated. When the COL-SEL signal is equal to 2, the Y' signal is generated. When the COL-SEL signal is equal to 3, the K' signal is generated.

A line buffer 160 has a capacity of one line of about the A4 size and stores an output signal of the selector 110 synchronously with a write clock 166 and generates an READ-DT signal synchronously with a read clock 167.

The CPU 116 sets the copy magnification supplied from the operation unit 51 into a clock generation circuit 165. The clock generation circuit 165 supplies the write clocks 166 according to the copy magnification to the line buffer 160 in case of the reduction, thereby performing the reduction in the main scanning direction. The clock generation circuit 165, on the contrary, generates the read clocks 167 according to the copy magnification to the line buffer 160 in case of the enlargement, thereby performing the enlargement in the main scanning direction.

A page memory 111 has a capacity of one color of about the A4 size. As for an address in the page memory 111, the pixel discrimination count output H-ADR in one line from the main scan address counter 104 is supplied as a lower order of the address. A line count output V-ADR from a subscan address counter 115 is supplied as an upper order of the address. The subscan address counter 115 is initialized by a page start signal ITOP from a photo sensor 150 arranged near the transfer drum 27 and generates the line count output V-ADR in the page.

As mentioned above, the address in the memory 111 is generated synchronously with the image reading and image recording operations on a page unit basis.

The switching between the writing and reading operations to/from the memory 111 is performed by a port output signal MWR from the CPU 116. When the signal MWR is at the H level, the writing operation to the memory is executed. When the signal MWR is at the L level, the reading operation from the memory is performed.

A BD counter 130 and an ITOP counter 140 are counters for generating signals of periods similar to those of a BD signal and an ITOP signal, which will be explained hereinlater. The counters 130 and 140 are used when the scanner motor 17 and the polygon mirror 18 are not rotated and the BD signal and the ITOP signal are necessary, for instance, when the image signal is merely written into the page memory 111 or the like. In this instance, by setting a BDSEL signal to the H level by the CPU 116, selectors 131 and 141 are switched and a signal BDC from the BD counter 130 and a signal ITOPC from the ITOP counter 141 are selected. The counters 130 and 140 can be initialized and data can be set into those counters by the CPU 116.

Figure 7B:
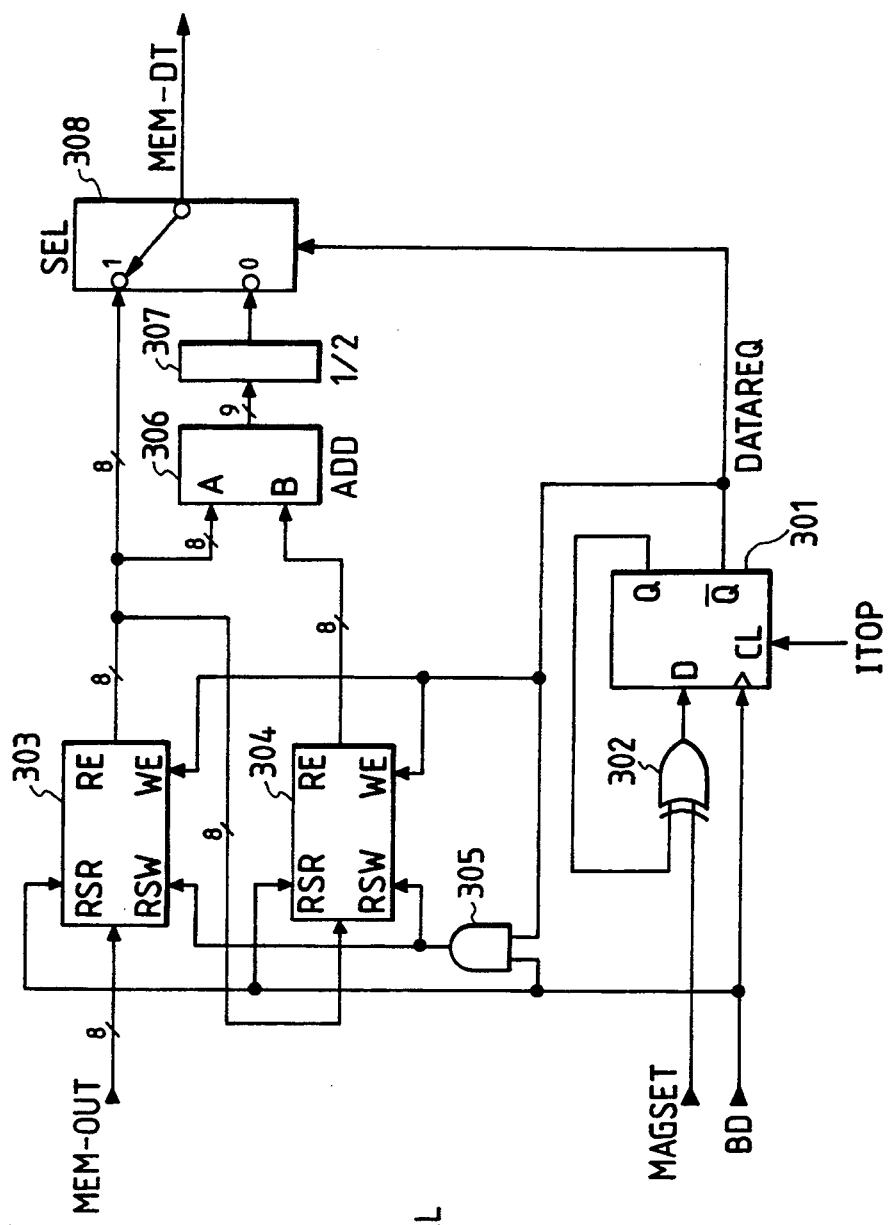
FIGS. 7A and 7B are block diagrams showing constructions of a reduction circuit and an expansion circuit in the second embodiment.
Figure 7A:
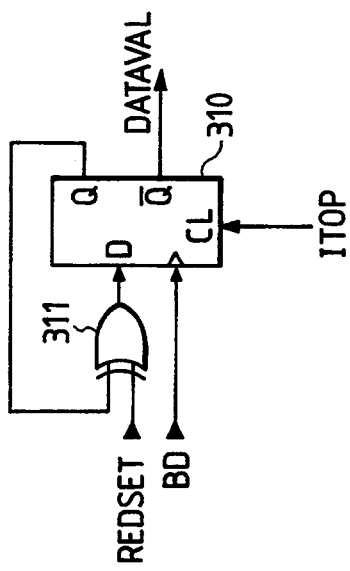

FIG. 7A shows in detail a reduction circuit 132. A flip-flop 310 generates a DATAVAL signal synchronously with the BD signal and is cleared by the ITOP signal. An XOR gate 311 always sets the DATAVAL signal of the flip-flop 310 to the H level when an REDSET signal from the CPU 116 is at the L level. When the REDSET signal is at the H level, the DATAVAL signal is sequentially set to the L level→H level→L level→H level, - - - synchronously with the BD signal. The DATAVAL signal controls the MWR signal by an AND gate 134 and also controls a CLK signal of the subscan address counter 115 by an AND gate 136.

FIG. 7B shows in detail an enlargement circuit 137. A flip-flop 301 generates a DATAREQ signal synchronously with the BD signal and is cleared by the ITOP signal. An XOR gate 302 always sets the DATAREQ signal of the flip-flop 301 to the H level when an MAG-SET signal from the CPU 116 is at the L level. When the MAGSET signal is at the H level, the DATAREQ signal is sequentially set to the L level→H level→L level→H level, - - - synchronously with the BD signal.

Memories 303 and 304 are 1-line delay memories which are constructed by FIFO (First-in First-out) memories. Each of the memories 303 and 304 has a capacity of about 5 kbytes corresponding to one line. When the DATAREQ signal is at the H level, the writing operation to each of those memories is executed. A reading counter is reset by the BD signal. A writing counter of each of the FIFO memories 303 and 304 is reset by an AND gate 305 synchronously with the DATAREQ signal and the BD signal. The reading operation is always executed.

An adder 306 is an 8-bit adder. A divider 307 shifts a 9-bit signal to lower order bits by one bit at a time, thereby performing the division by 2. A selector 308 selects an output signal of the FIFO memory 303 when the DATAREQ signal is at the H level. The selector 308 selects the average value of the output signals of the FIFO memories 303 and 304 when the DATAREQ signal is at the L level.

A selector 135 switches the DATAVAL signal from the reduction circuit 132 and the DATAREQ signal from the enlargement circuit 137. The selector 135 selects the DATAVAL signal in the writing mode to the memory 111, namely, when the MWR signal is at the H level.

A selector 112 selects either image data READ-DT which is obtained by processing the image signal read by the image pickup device 14 in a real-time manner or read data MEM-DT from the memory 111 and generates a VIDEO signal.

A laser and a laser driver 113 controls a emission amount of the laser in accordance with the VIDEO signal as a density signal of eight bits. The laser beam is scanned in the axial direction of the photo sensitive drum 19 by the polygon scanner 18, thereby forming an electrostatic latent image of one line onto the surface of the drum 19. A photo detector 114 is provided near the drum 19 and detects the passage of the laser beam just before the drum 19 is scanned and generates the sync signal BD of one line. The main scan address counter 104 is initialized (cleared) by the BD signal.

The photo sensor 150 detects that the transfer drum 27 reaches a predetermined position. Then, the photo sensor 150 generates the page sync signal ITOP and initializes the subscan address counter 15 and generates the page sync signal ITOP to the CPU 116. Thus, the CPU 116 reads the image and controls the image recording operation.

A read motor controller 117 controls the advance/reverse movements and speed of the reading drive motor 15. A development unit motor controller 118 is a controller of a development unit motor 119 for moving the development units 5a to 5d, thereby moving a predetermined development unit to the developing position of the photo sensitive drum 19.

An I/O port 120 controls the other sensors and actuators which are necessary to control the copying operation. A PF signal to feed the paper from the cassette is also included in the I/O port 120.

Figure 8:
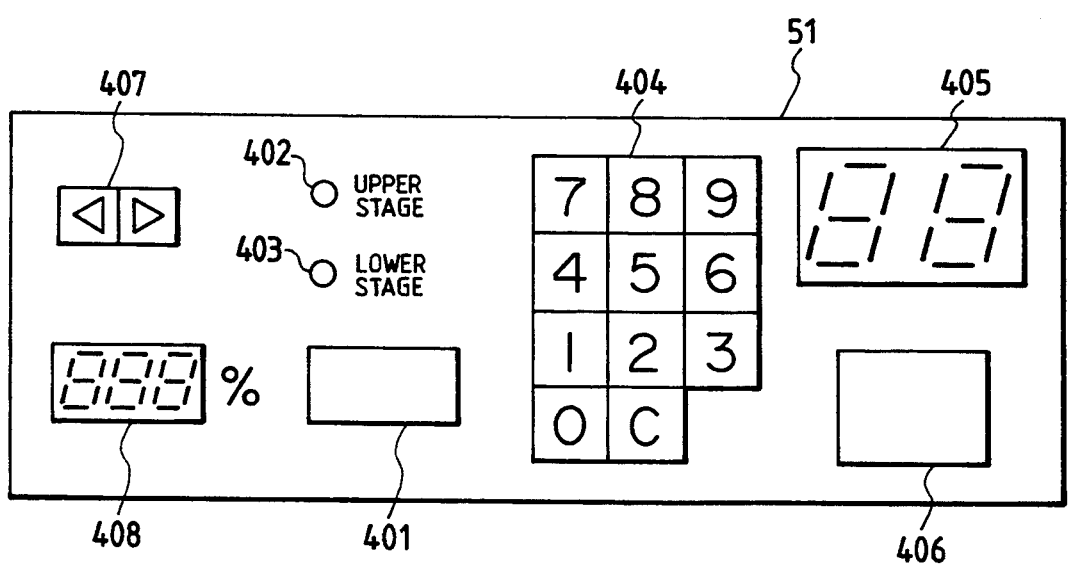
FIG. 8 is a plan view showing a construction of an operation unit in the second embodiment.

FIG. 8 is a plan view showing the details of the operation unit 51.

The operation unit 51 has: a selection switching key 401 of paper feed stages; an LED (light emitting diode) display unit 402 indicating that the upper stage cassette has been selected; an LED display unit 403 indicating that the lower stage cassette has been selected; a group of keys 404 comprising a ten-key to designate the number of copy papers and a clear key 404 to clear the designated number of copy papers; an input copy number display unit 405 which is constructed by a 7-segment LED of two digits; a copy start key 406; an enlargement/reduction setting key 407 to set an enlargement or reduction ratio; and a 7-segment LED 408 of three digits to display the enlargement or reduction ratio.

Each of the image forming operations in the copying machine with a construction as mentioned above will now be described with reference to flowcharts.

Figure 9:
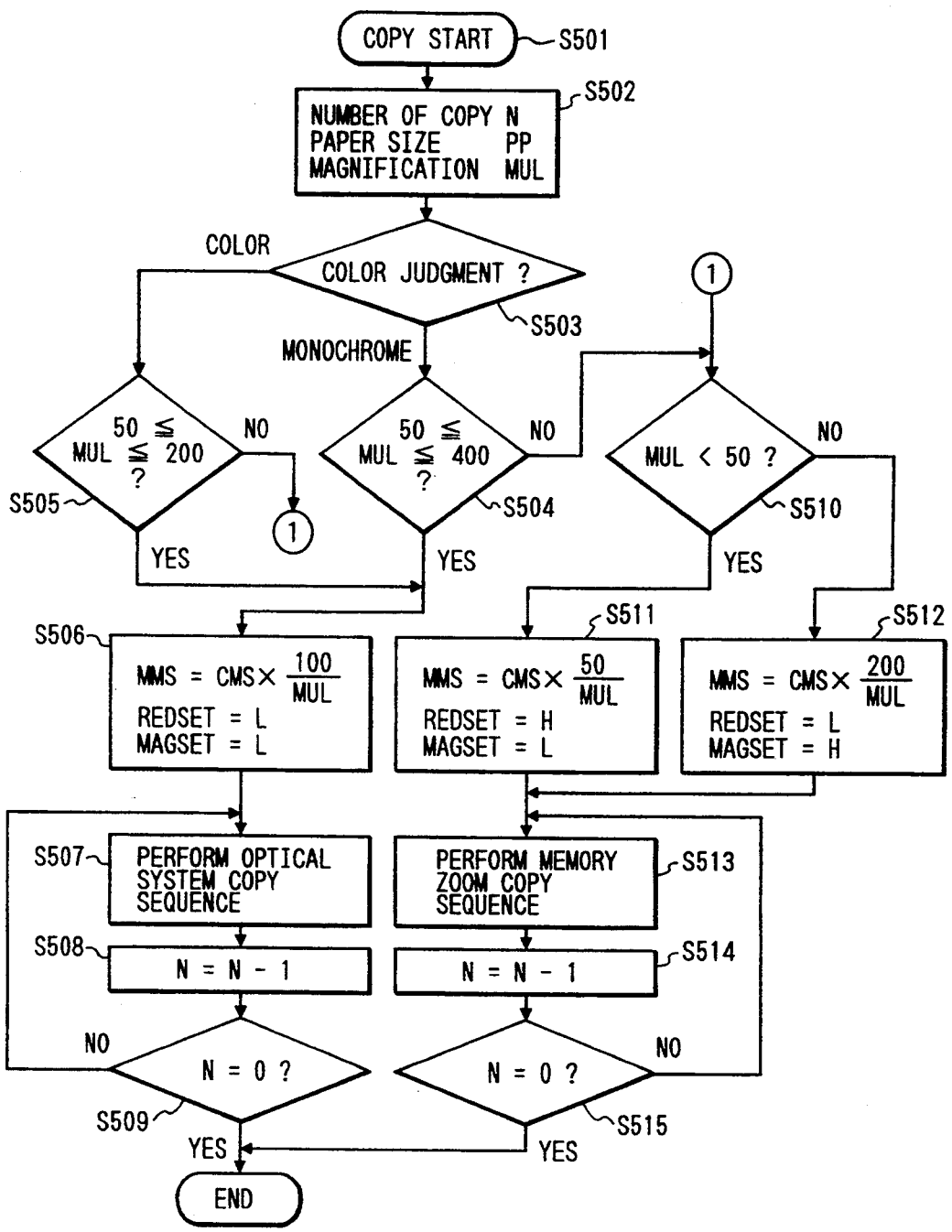
FIG. 9 is a flowchart showing the copying operation in the second embodiment.

FIG. 9 is a flowchart showing the control of the copying operation accompanied with a zoom.

In the embodiment, a zoom within a range from 25 to 400% is realized by using the optical system drive motor 15 which can realize a zoom in a range from 50 to 400%.

First, the copy magnification is set by the enlargement/reduction setting key 407 in the operation unit 51. The number of copy papers is set by the ten-key 404. The paper size is set by the paper selecting key 401. When the copy start key 406 is depressed (step S501), the number N of copy papers, the paper size PP, and the copy magnification MUL are set into the CPU 116 (S502).

The CPU 116 subsequently checks whether the copy original is a monochrome (black and white) original or a color original in step S503. When the copy original is the monochrome original, step S504 follows. When it is the color original, step S505 is selected. In the above judgment, for instance, the CPU 116 reads the original while scanning the optical system and reads out an output signal of the A/D converter 107 and calculates a difference between the maximum value and the minimum value among the input signal levels of R, G, and B of one pixel. The CPU 116 samples a few pixels and executes the above operations with respect to each of the sampled pixels and determines that the image of the copy original is the color image when the difference is larger than a preset value. It is also possible for the operator to designate the kind of original from the operation unit 51.

In case of the monochrome original, the copy magnification MUL is discriminated in step S504. When the copy magnification lies within a range from 50 to 400% (50≦MUL≦400), step S506 follows. When it is less than 50%, the processing routine advances to step S511 through step S510.

In case of the color original, the copy magnification MUL is discriminated in step S505. When the copy magnification MUL lies within a range from 50 to 200% (50≦MUL≦200), step S506 follows. When it is less than 50%, the processing routine advances to step S511 through step S510. When it is larger than 200%, the processing routine advances to step S512 through step S510.

When step S506 is selected, namely, when the original is the monochrome original and the magnification lies within a range from 50 to 400% and when the original is the color original and the magnification lies within a range from 50 to 200%, a speed MMS of the optical system driving motor is equal to $$MMS = CMS \times 100/MUL$$

assuming that a motor speed in the equal magnification of 100% is set to CMS. For instance, when the original is the monochrome original and the copy magnification is equal to 250%, the speed MMS of the motor is equal to CMS×0.4, so that the optical system driving motor is driven at a speed of about 40% of the motor speed CMS in the equal magnification of 100%.

In the reducing mode, a frequency of write clocks 166 is set in accordance with the magnification supplied from the operation unit 51. In the enlarging mode, a frequency of the read clocks 167 is set in accordance with the magnification supplied from the operation unit 51.

The REDSET signal is set to the L level and the MAGSET signal is also set to the L level by the CPU 116. An optical system copy sequence, which will be explained hereinlater, is executed in step S507 hereinbelow. After completion of the copying operation of one paper, "1" is subtracted from the number N of copy papers in step S508. The number of remaining copy papers is discriminated in step S509. When it is equal to 0, the copying operation is finished. When it is other than 0, the optical system copy sequence is again executed (S507).

When step S511 is selected, namely, when the original is the monochrome original or color original and the magnification MUL is set to (25≦MUL≦50), the optical system driving motor speed MMS is equal to $$MMS = CMS \times 50/MUL$$

For example, when the copy magnification is equal to 26%, the motor is driven at a speed of about 192.3% of the speed in case of the equal magnification. Such a speed corresponds to the copy magnification of 52% in the case where the zoom in the subscanning direction was performed by the optical system. The REDSET signal is set to the H level and the MAGSET signal is set to the L level by the CPU 116.

A frequency of the write clocks 166 is set in accordance with the magnification supplied from the operation unit 51.

By setting the REDSET signal to the H level, when the image data is stored into the memory 111, the DATAVAL signal is alternately repetitively set to the H and L levels synchronously with the BD signal. When the DATAVAL signal is at the L level, the counting-up operation of the subscan address counter 115 is temporarily stopped, the MWR signal is set to the L level, and the storage of the image data into the memory 111 is stopped. By storing the image data into the memory 111 every other line as mentioned above, the reduction of 50% in the subscanning direction is realized in the memory 111. That is, the reduction of 52% is realized in the optical system. The reduction of 50% is realized in the memory 111. Consequently, the reduction of 26% in the subscanning direction can be accomplished as a whole.

A memory zoom copy sequence, which will be explained hereinlater, is executed in step S513 hereinbelow. After completion of the copying operation of one paper, "1" is subtracted from the number N of copy papers in step S514. The number of remaining copy papers is discriminated in step S515. When it is equal to 0, the copying operation is finished. When it is other than 0, the memory zoom copy sequence (S513) is again executed.

When step S512 is selected, namely, when the original is the color original and the copy magnification MUL is set to (200≦MUL≦400), the optical system driving motor speed MMS is equal to $$MMS = CMS \times 200/MUL$$

For example, when the original is the color original and the copy magnification is equal to 250%, the motor is driven at a speed of 80% as that in case of the equal magnification. Such a speed corresponds to the copy magnification 125% in the case where the zoom in the subscanning direction has been performed by the optical system. A frequency of the read clocks 167 is set in accordance with the magnification supplied from the operation unit 51. The REDSET signal is set to the L level and the MAGSET signal is set to the H level by the CPU 116. By setting the MAGSET signal to the H level, the DATAREQ signal is alternately repetitively set to the H level and L level synchronously with the BD signal when the image data is read out from the memory 111.

When the DATAREQ signal is at the H level, the image signal of one line from the FIFO memory 303 is directly generated and the image signal of the FIFO memory 303 is stored into the FIFO memory 304. The image signal of new one line is stored into the FIFO memory 303. When the DATAREQ signal is subsequently set to the L level, the counting-up operation of the subscan address counter 115 is temporarily stopped and the intermediate value of the image signals in the FIFO memories 303 and 304 is generated. That is, the enlargement of 200% in the subscanning driection is realized by forming the image signal between the lines by interpolating the image signal of two lines. As mentioned above, the enlargement of 125% is realized in the optical system. The enlargement of 200% of that upon generation from the memory 111 is realized. Thus, the enlargement of 250% in the subscanning direction can be accomplished as a whole.

The memory zoom copy sequence is subsequently executed in step S513. After completion of the copying operation of one copy paper, "1" is subtracted from the number N of copy papers in step S514. The number of remaining copy papers is discriminated in step S515. When it is equal to 0, the copying operation is finished. When it is other than 0, the memory zoom copy sequence is again executed (S513).

When the copy magnification lies within a range from 200 to 400%, the zooming methods are different for the monochrome original and the color original as mentioned above. In case of the color original, the speed control range of the optical system driving motro 15 is reduced. That is, since CCDs of three lines are used as an image pickup device 14, when the image of the monochrome original is read, the image signals for recording are derived from the outputs of three CCDs. When reading the monochrome original, since the oscillating motions of three CCDs are mutually set off, influences by the oscillating motions of the CCDs are reduced. Therefore, as compared with the case of reading the color image, when the monochrome original is read, there is no need to use the memory zoom sequence at speeds in a wide range. For instance, it is also possible to change the lower limit values of the threshold values so as not to use the memory zoom sequence when the magnification lies within a range from 40 to 400% in case of a monochrome original and when it lies within a range from 60 to 200 % in case of a color original.

Figure 10:
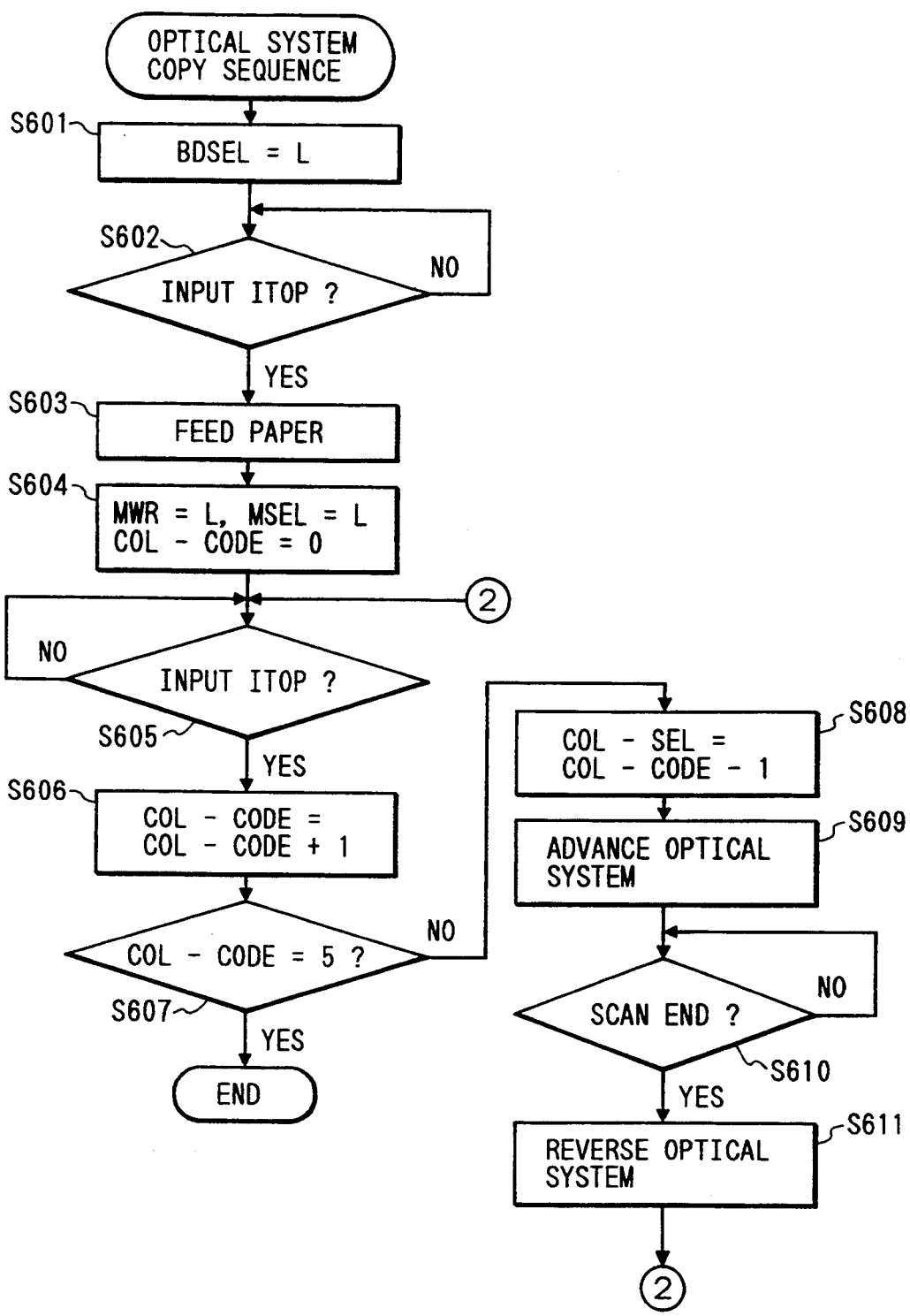
FIG. 10 is a flowchart showing the copy sequence operation of an optical system in the second embodiment.

FIG. 10 is a flowchart showing an optical system color copy sequence.

First, the CPU 116 sets the BDSEL signal to the L level and selects the ITOP signal from the photo sensor 150 and the BD signal from the photo detector 114 (S601).

When the CPU 116 detects the input of the ITOP signal (S602), the CPU 116 drives the pickup roller (32 or 33), feed roller (30 or 31), and resist roller 29 of the selected paper feed stage and winds the paper around the surface of the transfer drum 27 by the PF signal from the I/O port 120 (S603). Subsequently, the MWR signal and MSEL signal are set to the L level and "0" is set into a COL-CODE register provided in an internal memory (not shown) of the CPU 116 (S604).

The apparatus waits for the input of the ITOP signal and the image recording start timing for the paper wound around the transfer drum is discriminated (S605). When the ITOP signal is supplied, the value in the COL-CODE is increased by only "1" (S606). The value in the COL-CODE indicates the recording color. Namely, 1 corresponds to magenta (M); 2 cyan (C); 3 yellow (Y); and 4 black (K).

The COL-CODE register is subsequently checked, thereby discriminating whether the recording operations of four colors have been finished or not (S607). When the value in COL-CODE register is equal to either one of the values 1 to 4, this means that the recording operations of four colors are not yet finished, so that the image recording is executed in step S608 and subsequent steps.

First, the value which is smaller than the value in the COL-CODE register by 1 is generated as a COL-SEL signal in step S608 and a predetermined color signal is selected by the selector 110. The development unit of the designated color is selected by the development unit motor controller. In step S609, the optical system driving motor 15 is driven by the read motor controller, the optical system is allowed to advance at a preset speed MMS of the optical system driving motor, and the image of the first page is recorded by the image signal READ-DT which has been read by the CCD. In step S610, the apparatus waits for the completion of the reading operation of the original of a predetermined distance corresponding to the paper size and the operation to return the optical system to the original read start position is started in step S611. The processing routine is returned to step S605 after that. When the value of COL-CODE is equal to 0 in step S607, the processing routine is finished.

In case of the monochrome copy, the CPU 116 sets 4 into the COL-CODE register in step S604. Thus, the black signal is selected by the selector 110 and the development unit of black is selected.

Figure 11:
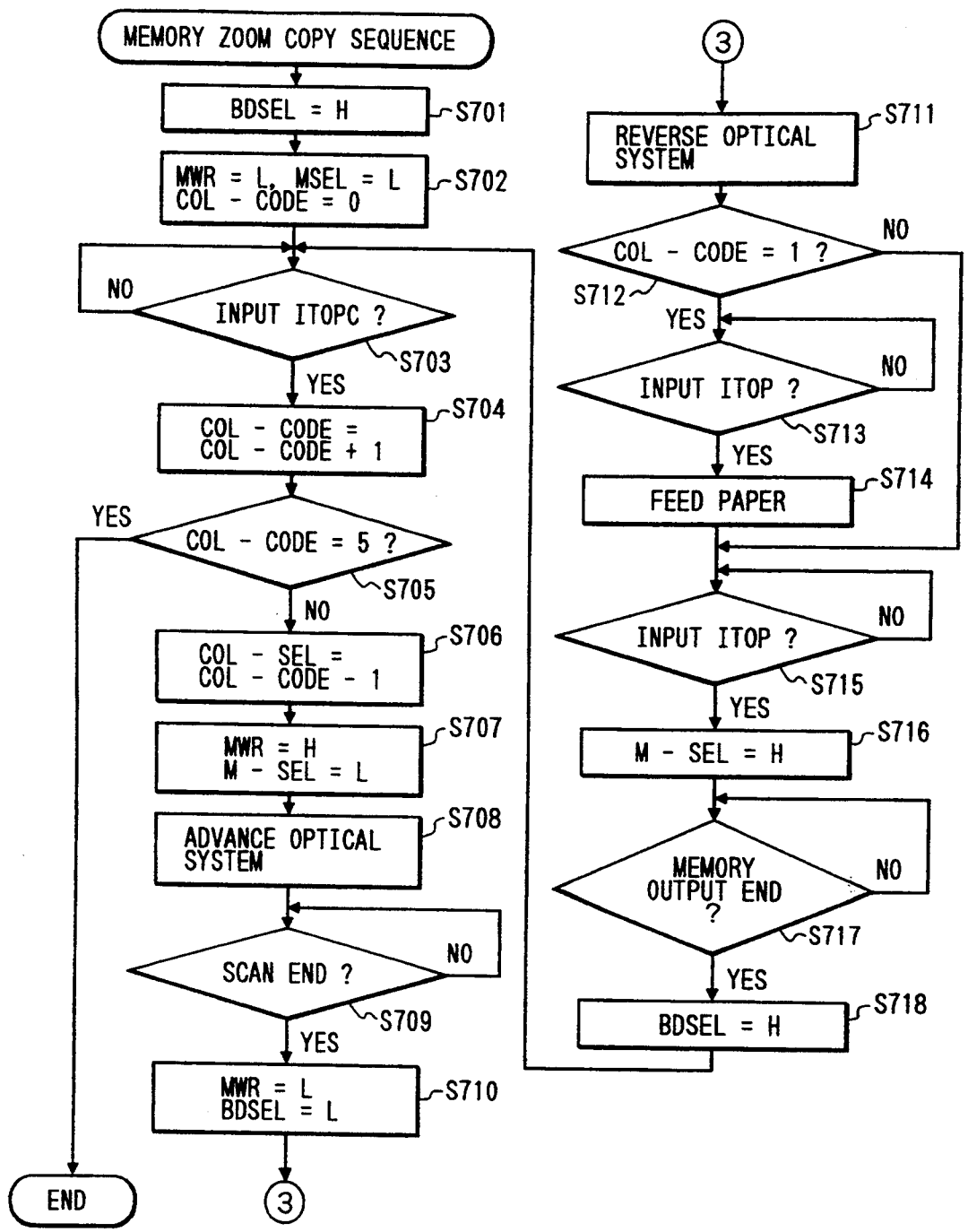
FIG. 11 is a flowchart showing the memory zoom copy sequence operation in the second embodiment.

FIG. 11 is a flowchart showing the memory zoom copy sequence.

The CPU 116 first sets the BDSEL signal to the H level in step S701 and a BDC signal from the BD counter 130 and an ITOPC signal from the ITOP counter 140 are selected.

In step S702, the MWR signal and MSEL signal are set to the L level and 0 is set into the COL-CODE register provided in the internal memory of the CPU 116.

When the ITOPC signal is supplied (S703), the CPU 116 increases the value of COL-CODE by only 1 (S704). The value of COL-CODE indicates the recording color. Namely, 1 corresponds to magenta (M); 2 cyan (C); 3 yellow (Y); and 4 black (K).

In step S705, the COL-CODE register is checked and whether the recording operations of four colors have been finished or not is discriminated. When the value of COL-CODE is equal to either one of the values 1 to 4, this means that the recording operations of four colors are not yet finished, so that the image is recorded in step S706 and subsequent steps.

The value which is smaller than the value of COL-CODE by 1 is first generated as a COL-SEL signal in step S706. A predetermined color signal is selected by the selector 110. In step S707, the MWR signal is set to the H level, thereby enabling the read-out image data READ-DT from the image pickup device 14 to be recorded into the memory 111 and setting the M-SEL signal to the L level.

After preparing as mentioned above, the motor 15 is driven by the read motor controller 117 in step S708. The optical system is advanced at a preset optical system driving speed MMS according to the zoom ratio. The image signal READ-DT which had been read by the image pickup device 14 and has been subjected to the reduction or enlargement in the main scanning direction when the image data is written into or read out from the line buffer 160 is stored into the memory 111. In this instance, when the REDSET signal is at the H level due to the initialization in step S511, the reduction writing operation in the subscanning direction as mentioned above is executed. When the image signal is written into the memory 111, no image is formed onto the photo sensitive drum 19.

The apparatus waits for the completion of the reading operation of the original in step S709. The MWR signal is set to the L level in step S710, thereby finishing the writing operation to the memory 111. The BDSEL signal is also set to the L level, thereby selecting the ITOP signal from the photo sensor 150 and the BD signal from the photo detector 114.

After that, in step S711, the CPU 116 starts the operation to return the optical system to the original read starting position. In step S712, the COL-CODE register is checked. When it is set to 1, steps S713 and S714 are executed.

When the input of the ITOP signal is first detected in step S713, the CPU 116 drives the pickup roller (32 or 33), feed roller (30 or 31), and resist roller 29 of the selected paper feed stage by the PF signal from the I/O port 120 in step S714 and winds the paper around the surface of the transfer drum.

When the ITOP signal is supplied in step S715, the M-SEL signal is set to the H level in step S716 and the image is recorded by the image signal MEM-DT by which the image data written in the memory 111 has been read out. In this instance, when the MAGSET signal is at the H level, the above enlargement reading operation in the subscanning direction is executed by the initialization in step S512.

After that, the BDSEL signal is again set to the H level in step S717 and the BDC signal from the BD counter 130 and the ITOPC signal from the ITOP counter 140 are selected. The processing routine is returned to step S703 after that. When the COL-CODE is set to 0 in step S705, the processing routine is finished.

The third embodiment of the invention will now be described.

In the above second embodiment, the zoom within a range from 25 to 400% has been realized by using the optical system driving motor which can accomplish the zoom in a range from 50 to 400%. In the following third embodiment, however, the zoom ratio is further expanded and the zoom in a range from 12.5 to 800% can be realized. A mechanical construction of the apparatus and a fundamental construction of the control unit in the third embodiment are similar to those shown in FIGS. 5 and 6.

Figure 12:
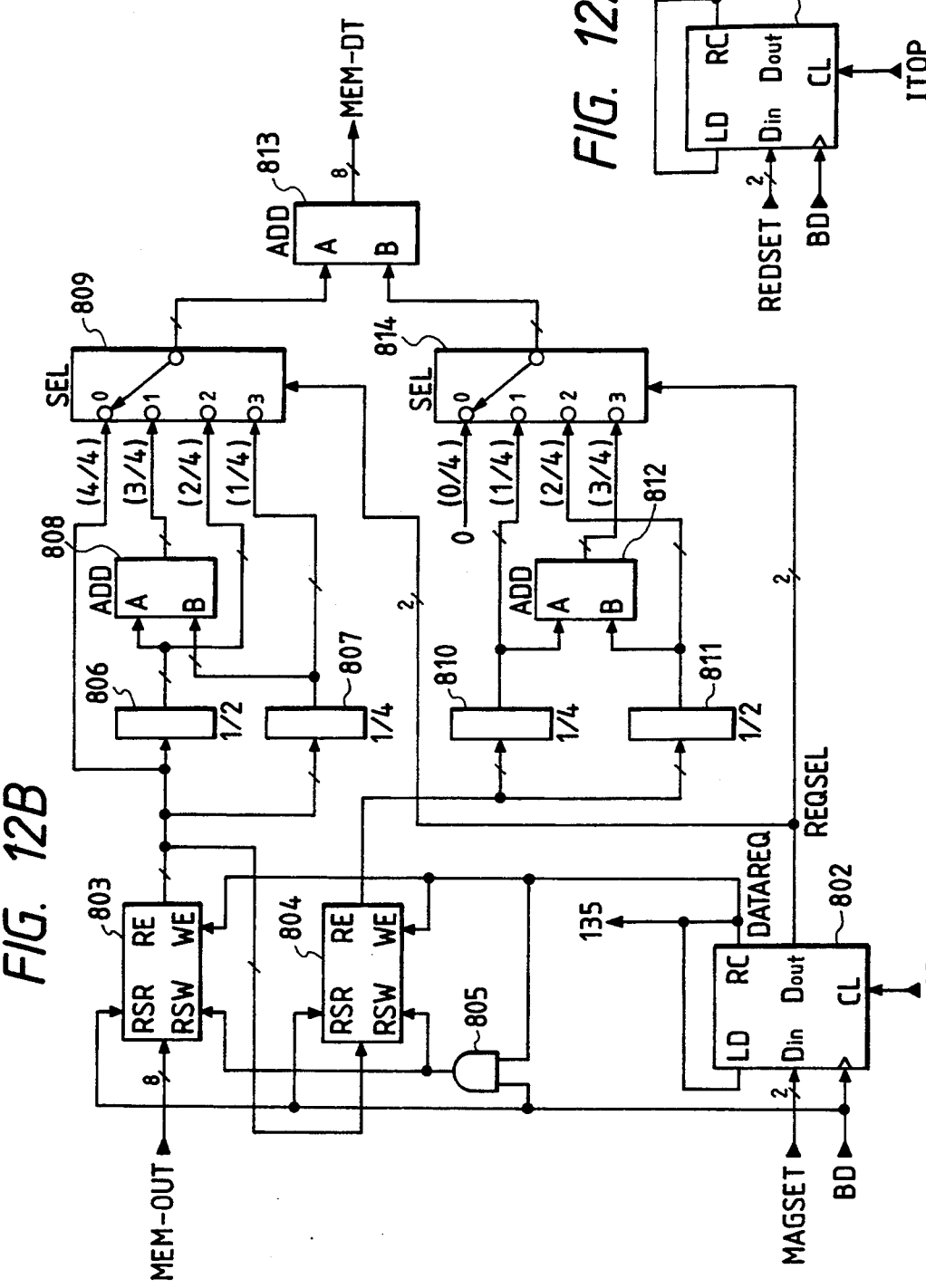
FIGS. 12A and 12B are block diagrams showing constructions of a reduction circuit and an expansion circuit in the third embodiment of the invention.

The reduction circuit 132 in the third embodiment is shown in FIG. 12A.

A counter 801 is a down counter of two bits and counts down synchronously with the BD signal and is initialized by the ITOP signal. The REDSET signal of two bits is supplied as a load value to the counter 801 from the CPU 116. An output RC (ripple carry) signal controls as a DATAVAL signal the WE signal by the AND gate 134 and also controls the CLK signal to the subscan address counter 115 by the AND gate 136. For instance, when the REDSET signal is set to 0, the DATAVAL signal is always set to the H level. When the REDSET signal is set to 3, the DATAVAL signal is set to the H level once per four times such as L→L→L→H→L→L→L→H - - - synchronously with the BD signal.

FIG. 12B shows the enlargement circuit 137 of the embodiment.

A counter 802 is a down counter of two bits and counts down synchronously with the BD signal and is initialized by the ITOP signal. The MAGSET signal of two bits is supplied as a load value to the counter 802 from the CPU 116. The RC (ripple carry) signal is generated as a DATAREQ signal and a count signal DOUT is generated as a REQSEL signal.

For instance, when the MAGSET signal is set to 3, the REQSEL signal is generated such as 3→2→1→0→3→2→1→0 - - - synchronously with the BD signal. Only when the REQSEL signal is set to 0, the DATAREQ signal is set to the H level.

Memories 803 and 804 are one-line delay memories which are constructed by FIFO memories and each of the memories has a capacity of about 5 kbytes corresponding to one line. When the DATAREQ signal is at the H level, each of the memories 803 and 804 executes the writing operation and a counter to read out is reset by the BD signal. A counter to write of the FIFO memories 803 and 804 is reset by an AND gate 805 synchronously with the DATAREQ signal and BD signal. The reading operations are always performed.

Each of dividers 806 and 811 performs the division by 2 by shifting each signal one bit by one to the lower bits. Each of dividers 807 and 810 performs the division by 4 by shifting each signal by two bits at a time to the lower bits. Each of adders 808, 812, and 813 is an adder of eight bits. Each of selectors 809 and 814 is a selector of two bits and switches an output signal by the REQSEL signal.

In the enlargement circuit 137, the following control is executed by using the above dividers, adders, and selectors.

First, when the REQSEL signal is set to the 0 level, only the output from the FIFO memory 803 is selected. When the REQSEL signal is set to the 1 level, the sum of the signal of $\frac{3}{4}$ of the output from the FIFO memory 803 and the signal of $\frac{1}{4}$ of an output from the FIFO memory 804 is generated. When the REQSEL signal is set to the 2 level, the sum of the signal of $\frac{1}{2}$ of the output from the FIFO memory 803 and the signal of $\frac{1}{2}$ of the output from the FIFO memory 804 is generated. When the REQSEL signal is at the 3 level, the sum of the signal of $\frac{1}{4}$ of the output from the FIFO memory 803 and the signal of $\frac{3}{4}$ of the output from the FIFO memory 804 is generated. Those output signals are supplied as MEM-DT to the selector 112. After that, controls similar to those in the second embodiment are executed hereinafter.

Figure 13:
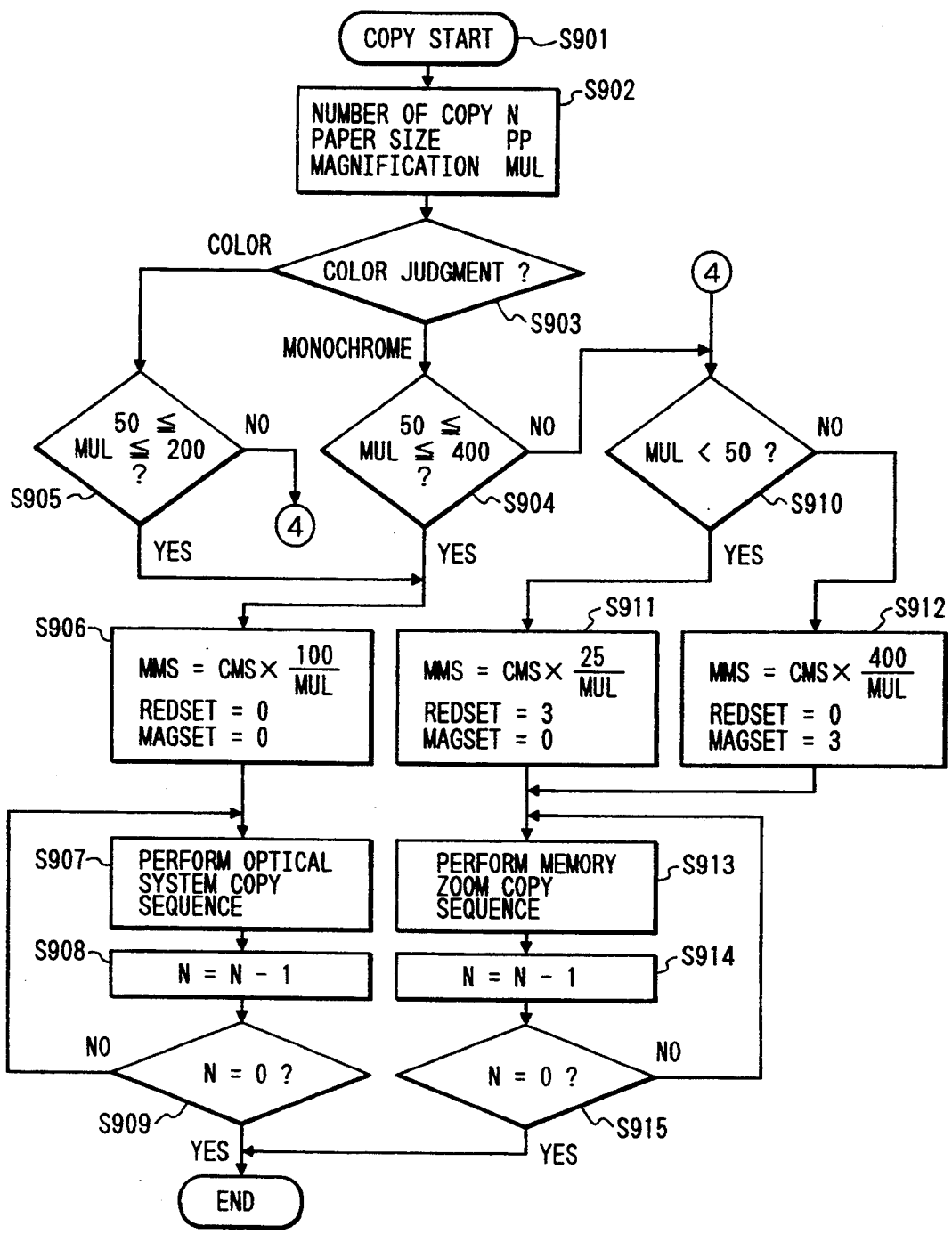
FIG. 13 is a flowchart showing the copying operation in the third embodiment.

FIG. 13 is a flowchart showing the control of the copying operation accompanied with a zoom process.

According to the third embodiment, a zoom within a range from 12.5 to 800% is realized by using an optical system driving motor which can perform a zoom in a range from 50 to 400%.

The copy magnification is set by the enlargement/reduction setting key 407 of the operation unit 51, the number of copy papers is set by the ten-key 404, and the paper size is set by the paper selecting key 401. When the copy start key 406 is depressed (S901), the number N of copy papers, paper size PP, and copy magnification MUL are set into the CPU 116 (S902).

In a manner similar to the second embodiment, the CPU 116 discriminates whether the copy original is the monochrome original or color original in step S903. When it is the monochrome original, step S904 follows. When it is the color original, step S905 follows. In case of the monochrome original, the copy magnification MUL is discriminated in step S904. When the copy magnification lies within a range from 50 to 400% ($50 \leq MUL \leq 400$), step S906 follows. When it is less than 50%, the processing routine advances to step S911 through step S910. When it is larger than 400%, the processing routine advances to step S912 through step S910.

In case of the color original, the copy magnification MUL is discriminated in step S905. When the copy magnification lies within a range from 50 to 200% ($50 \leq MUL \leq 200$), step S906 follows. When it is less than 50%, the processing routine advances to step S911 through step S910. When it is larger than 200%, the processing routine advances to step S912 through step S910.

First, when the processing routine advances to step S906, the speed MMS of the optical system driving motor 15 is equal to $$MMS = CMS \times 100/MUL$$

When it is assumed that the motor speed at an equal magnification of 100% is set to CMS. A frequency of the write clocks 166 or read clocks 167 is set in accordance with the magnification. The CPU 116 sets the REDSET signal and the MAGSET signal to the 0 level. In subsequent step S907, an optical system copy sequence is executed in a manner similar to the second embodiment. After completion of the copying operation of one paper, "1" is subtracted from the number N of copy papers in step S908. The number of remaining copy papers is discriminated in step S909. When the number of remaining papers is equal to 0, the copying operation is finished. However, when it is not equal to 0, the optical system copy sequence (S907) is again executed.

When the processing routine advances to step S911, the speed MMS of the motor 15 is set to $$MMS = CMS \times 25/MUL$$

For instance, when the copy magnification is set to 16%, the motor is driven at a speed of about 156.25% of the speed at the equal magnification. This means that the zoom of the copy magnification of 64% in the subscanning direction is executed by the optical system. A frequency of the write clocks 166 is set in accordance with the magnification. The CPU 116 sets the REDSET signal to 3 level and the MAGSET signal to 0 level.

By setting the REDSET signal to 3 level, the DATAVAL signal is set to the H level once per four times of the L level synchronously with the BD signal when the image signal is stored into the memory 111. When the DATAVAL signal is at the L level, the counting-up operation of the subscan address counter 115 is temporarily stopped and the MWR signal is set to the L level, thereby stopping the storage of the image data into the memory 111. By storing the image data into the memory 111 by one line per four lines as mentioned above, the reduction of 25% in the subscanning direction is realized in the memory 111. That is, the reduction of 64% is realized by the optical system. The reduction of 25% is realized in the memory 111. As a whole, the reduction of 16% in the subscanning direction can be realized.

A memory zoom copy sequence similar to that in the second embodiment is executed hereinbelow in step S913. After completion of the copying operation of one paper, "1" is subtracted from the number N of copy papers in step S914. The number of remaining copy papers is discriminated in step S915. When it is equal to 0, the copying operation is finished. When it is not equal to 0, the memory zoom copy sequence (S913) is again executed.

When the processing routine advances to step S912, the speed MMS of the motor 15 is set to $$MMS = CMS \times 400/MUL$$

For instance, when the copy magnification is set to 700%, the motor is driven at a speed of about 57.1% of that at the equal magnification. This means that the zoom of a copy magnification of 175% in the subscanning direction is executed by the optical system. A frequency of the read clocks 167 is set in accordance with the magnification. The CPU 116 sets the REDSET signal to 0 level and sets the MAGSET signal to 3 level. By setting the MAGSET signal to 3 level, the REQSEL signal is generated such that 3→2→1→0→3→2→1→0 - - - synchronously with the BD signal when the image signal is read out from the memory 111. The DATAREQ signal is set to the H level only when hte REQSEL signal is set to 0 level.

When the REQSEL signal is set to 0 level, the image signal of one line from the FIFO memory 303 is directly generated, the image signal in the FIFO memory 303 is stored into the FIFO memory 304, and the image signal of new one line is stored into the FIFO memory 303. When the REQSEL signal is not at 0 level, the counting-up operation of the subscan address counter 115 is temporarily stopped. The sum of the signals obtained by multiplying respective weights to the signals in the FIFO memories 303 and 304 in accordance with the value of the REQSEL signal is generated. Namely, the image signal of two lines is interpolated and an image signal between the lines is formed, thereby realizing the enlargement of 400% in the subscanning direction. As mentioned above, the enlargement of 175% is realized by the optical system and the enlargement of 400% is realized upon generation from the memory 111. Thus, the enlargement of 700% in the subscanning direction can be realized as a whole.

A memory zoom copy sequence is subsequently executed in step S913. After completion of the copying operation of one paper, "1" is subtracted from the number N of copy papers in step S914. The number of remaining copy papers is discriminated in step S915. When the number of remaining copy papers is equal to 0, the copying operation is finished. When it is not equal to 0, the memory zoom copy sequence is gain executed (S913).

In the above third embodiment, although the 2-bit counter 801 has been used in the reduction circuit 132 to realize the reduction of 12.5% in the subscanning direction, the image can be further reduced by using a counter of a larger number of bits. For instance, when a zoom in a range from 50 to 400% in the subscanning direction can be performed by the optical system, by using an n-bit counter in the reduction circuit 132, the reduction of up to $100/2^{(n+1)}\%$ can be executed. Even in the enlargement in the subscanning direction, on the contrary, by combining a multiple-bit counter, an adder, a divider, and a selector in the enlargement circuit 137, the image can be further enlarged.

The fourth embodiment of the invention will now be described. Although the zoom mode has been selected in accordance with the kind (color/monochrome) of original image in the second and third embodiments, the zoom mode is selected in accordance with a zoom ratio in the fourth embodiment.

Figure 14:
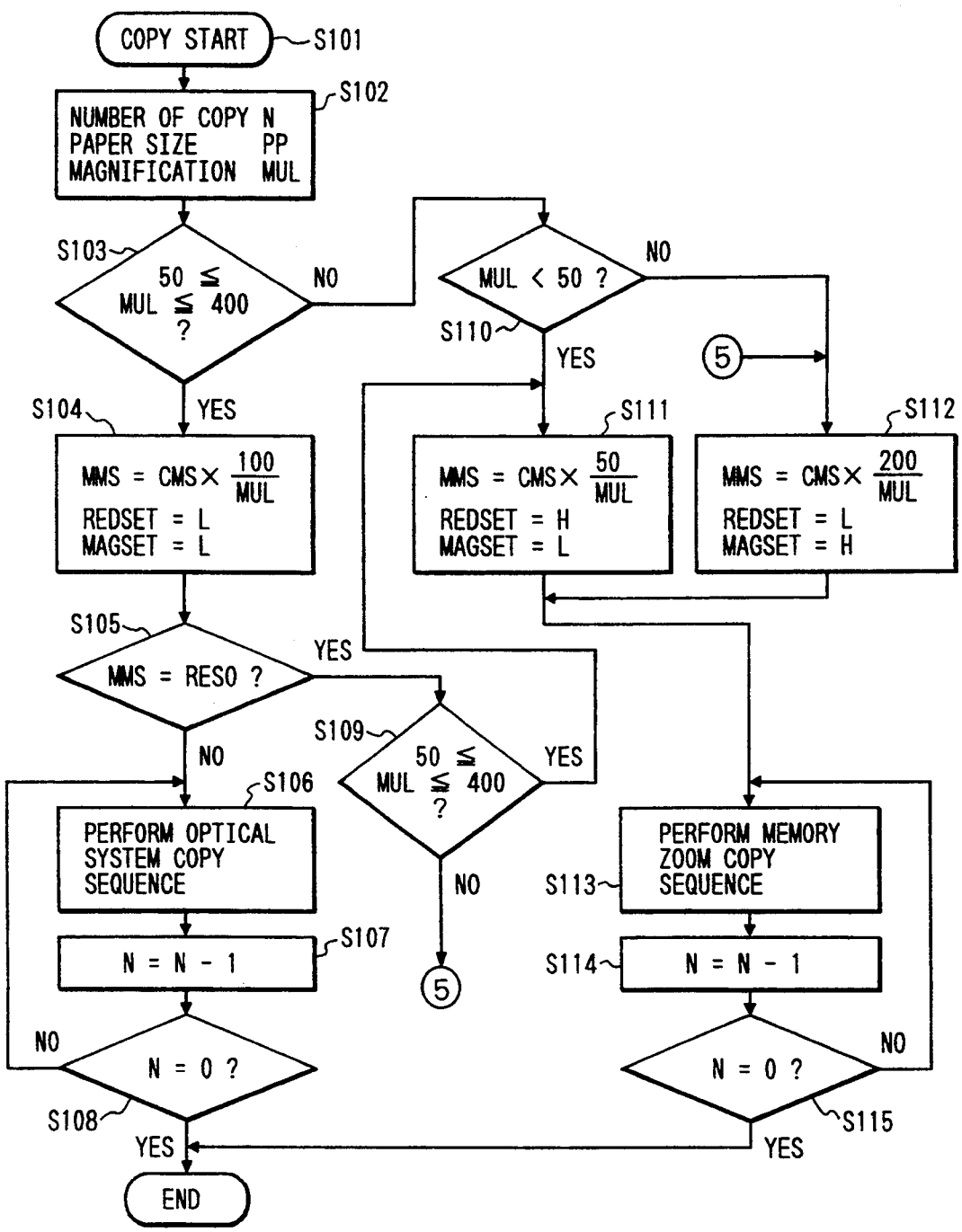
FIG. 14 is a flowchart showing the copying operation in the fourth embodiment of the invention.

FIG. 14 is a flowchart showing the copying operation in a copying machine according to the fourth embodiment. It is assumed that a construction of the apparatus is similar to that of the second embodiment.

In the fourth embodiment, a zoom in a range from 25 to 800% is realized by using an optical system driving motor which can perform a zoom in a range from 50 to 400%. A resonance rotational speed RESO of the motor 15 has been preset in a memory in the CPU 116.

The copy magnification is first set by the enlargement/reduction setting key in the operation unit 501, the number of copy papers is set by the ten-key 404, and the paper size is set by the paper selecting key 401. When the copy start key 406 is depressed (S101), the number N of copy papers, paper size PP, and copy magnification MUL are set into the CPU 116 (S102).

The CPU 116 discriminates the copy magnification MUL in step S103. When the copy magnification lies within a range from 50 to 400%, the initial value is set as shown in step S104. In this instance, the speed MMS of the motor 15 is equal to $$MMS = CMS \times 100/MUL$$

when the motor speed at the equal magnification of 100% is set to CMS. For example, when the copy magnfication is set to 250%, the speed MMS of the motor 15 is equal to CMS×0.4 and the motor is driven at a speed of about 40% of the motor speed. CMS at the equal magnficiation of 100%.

The CPU 116 sets the REDSET signal and MAGSET signal to the L level. Subsequently, a check is made in step S105 to see if the motor speed MMS is equal to the resonance rotational speed RESO or not. When they differ, an optical system copy sequence (S106) similar to that in the second embodiment is executed. After completion of the copying operation of one paper, "1" is subtracted from the number N of copy papers in step S107. The number of remaining copy papers is discriminated in step S108. When it is equal to 0, the copying operation is finished. When it is not equal to 0, the optical system copy sequence (S106) is again executed.

When the motor speed MMS is equal to the resonance rotational speed RESO in step S105, a zoom ratio is discriminated in step S109. When the zoom ratio is equal to or less than 100%, step S111 is executed. When the zoom ratio is larger than 100%, step S112 is executed.

For instance, when the copy magnfiication is set to 80%, the motor is driven at a speed MMS of 125% of that at the equal magnification in step S104. However, when the speed MMS is equal to the resonance rotational speed RESO, the CPU 116 sets the motor speed MMS to a speed of 62.5% of that at the equal magnification in step S111. This means that the zoom of the copy magnification of 160% is executed by the optical system, so that the resonance rotational speed can be avoided.

When the copy magnification is less than 50% in step S103, the processing routine advances to step S111 through step S110 and the initialization is executed. In this instance, the speed MMS of the motor 15 is set to $$MMS = CMS \times 50/MUL.$$

For example, when the copy magnification is set to 26%, the motor is driven at a speed of about 192.3% of that at the equal magnification. This means that the zoom of a copy magnification of 52% is executed by the optical system. The CPU 116 sets the REDSET signal to the H level and sets the MAGSET signal to the L level.

By setting the REDSET signal to the H level, the DATAVAL signal is alternately set to the H and L levels synchronously with the BD signal when the image signal is stored into the memory 111. When the DATAVAL signal is at the L level, the counting-up operation of the subscan address counter 115 is temporarily stopped and the MWR signal is set to the L level, thereby stopping the storage of the image data into the memory 111. By recording the image data into the memory 111 every other lines as mentioned above, the reduction of 50% is realized in the memory 111. That is, the reduction of 52% is realized by the optical system and the reduction of 50% is realized in the memory 111. Thus, the reduction of 26% can be performed as a whole.

A memory zoom copy sequence similar to that in the second embodiment will now be executed in step S113. After completion of the copying operation of one paper, "1" is subtracted from the number N of copy papers in step S114. The number of remaining copy papers is discriminated in step S115. When it is equal to 0, the copying operation is finished. When it is not equal to 0, the memory zoom copy sequence (S113) is again executed.

When the copy magnification is larger than 400% in step S103, the processing routine advances to step S112 through step S110 and the initialization is performed. In this instance, the speed MMS of the motor 15 is equal to $$MMS = CMS \times 200/MUL$$

For example, when the copy magnification is set to 740%, the motor is driven at a speed of about 27% of that at the equal magnification. This means that a zoom of a copy magnification of 370% is executed by the optical system. The CPU 116 sets the REDSET signal to the L level and sets the MAGSET signal to the H level. By setting the MAGSET signal to the H level, the DATAREQ signal is alternately set to the H and L levels synchronously with the BD signal when the image signal is read out from the memory 111.

When the DATAREQ signal is at the H level, the image signal of one line from the FIFO memory 303 is directly generated, the image signal in the FIFO memory 303 is stored into the FIFO memory 304, and the image signal of new one line is stored into the FIFO memory 303. When the DATAREQ signal is subsequently set to the L level, the counting-up operation of the subscan address counter 115 is temporarily stopped and the intermediate value of the image signals in the FIFO memories 303 and 304 is generated. That is, by forming the image signal between lines by interpolating the image signals of two lines, the enlargement of 200% is realized. As mentioned above, the enlargement of 370% is realized by the optical system and the enlargement of 200% is realized upon generation from the memory 111. Thus, the enlargement of 740% can be realized as a whole.

The memory zoom copy sequence is subsequently executed in step S113. After completion of the copying operation of one paper, "1" is subtracted from the number N of copy papers in step S114. The number of remaining copy papers is discriminated in step S115. When it is equal to 0, the copying operation is finished. When it is not equal to 0, the memory zoom copy sequence (S113) is again executed.

The fifth embodiment of the invention will now be described.

Figure 15:
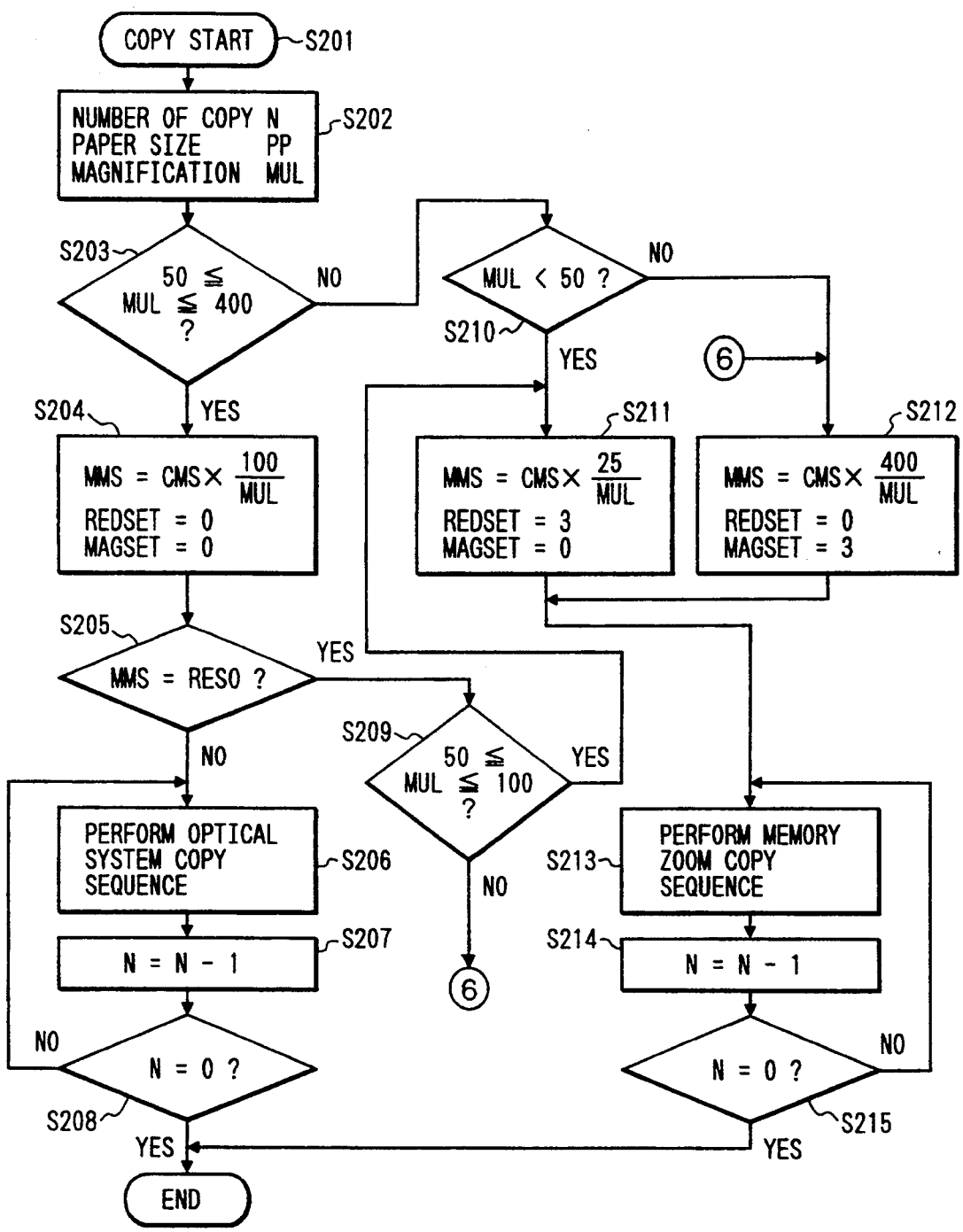
FIG. 15 is a flowchart showing the copying operation in the fifth embodiment of the invention.

FIG. 15 is a flowchart showing the copying operation in a copying machine according to the fifth embodiment. It is assumed that a construction of the apparatus is similar to that of the second embodiment.

In the fifth embodiment, a zoom within a range from 12.5 to 1600% is realized by using an optical system driving motor which can perform a zoom in a range from 50 to 400%. The resonance rotational speed RESO of the optical system driving motor has been preset in the CPU 116. It is now assumed that the resonance rotational speed doesn't exist in a range of the copy magnification from 100 to 200%.

First, the copy magnification is set by the enlargement/reduction setting key 407 in the operation unit 51. The number of copy papers is set by the ten-key 404. The paper size is set by the paper selecting key 401. When the copy start key 406 is depressed (S201), the number N of copy papers, paper size PP, and copy magnification MUL are set into the CPU 116 (S202).

The copy magnification MUL is discriminated in step S203 in a manner similar to the fourth embodiment. When the copy magnification lies within a range from 50 to 400%, the initial value is set as shown in step S204. In this instance, the speed MMS of the motor 15 is set to $$MMS = CMS \times 100/MUL$$

when the motor speed at the equal magnification of 100% is set to CMS. The CPU 116 sets the REDSET signal and MAGSET signal to 0 level.

A check is now made to see if the speed MMS of the motor 15 is equal to the resonance rotational speed RESO or not (S205). Thus, when they differ, an optical system copy sequence (S206) similar to the second embodiment is executed. After completion of the copying operation of one paper, "1" is subtracted from the number N of copy papers in step S207. The number of remaining copy papers is discriminated in step S208. When it is equal to 0, the copying operation is finished. When it is not equal to 0, the optical system copy sequence (S206) is again executed.

When the motor speed MMS is equal to the resonance rotational speed RESO in step S205, the zoom ratio is discriminated in step S209. When the zoom ratio is equal to or less than 100%, step S211 is executed. When it is larger than 100%, step S212 is executed.

For example, when the copy magnification is set to 350%, the motor is driven at a speed MMS of about 28.6% of the speed at the equal magnification in step S204. When the motor speed MMS is equal to the resonance rotational speed RESO, it is sufficient to drive the motor at a speed of about 14.4% of that at the equal magnification in step S212. This means that the zoom of the copy magnification of 87.5% is performed by the optical system, and the resonance rotational speed can be avoided.

When the copy magnification is less than 50% in step S203, the processing routine advances to step S211 through step S210 and the initialization is performed. In this instance, the speed MMS of the motor 15 is set to $$MMS = CMS \times 25 / MUL.$$

For instance, when the copy magnification is set to 16%, the motor 15 is driven at a speed of about 156.25% of the speed at the equal magnification. This means that the zoom of the copy magnification of 64% is executed by the optical system. The CPU 116 sets the REDSET signal to 3 level and sets the MAGSET signal to 0 level.

By setting the REDSET signal to 3 level, the DATAVAL signal is set to the H level once per four times of the L level synchronously with the BD signal when the image data is stored into the memory 111. When the DATAVAL signal is at the L level, the counting-up operation of the subscan address counter 115 is temporarily stopped and the MWR signal is set to the L level, thereby stopping the storage of the image data into the memory 111. By storing the image data into the memory 111 by one line per four lines as mentioned above, the reduction of 25% is realized in the memory 111. That is, the reduction of 64% is executed by the optical system and the reduction of 25% is executed in the memory 111, so that the reduction of 16% can be realized as a whole.

A memory zoom copy sequence similar to that in the second embodiment is subsequently executed in step S213. After completion of the copying operation of one paper, "1" is subtracted from the number N of copy papers in step S214. The number of remaining copy papers is discriminated in step S215. When it is equal to 0, the copying operation is finished. When it is not equal to 0, the memory zoom copy sequence (S213) is again executed.

When the copy magnification is larger than 400% in step S203, the processing routine advances to step S212 through step S210 and the initialization is executed. In this instance, the speed MMS of the motor 15 is set to $$MMS = CMS \times 400 / MUL.$$

For instance, when the copy magnification is set to 1552%, the motor 15 is driven at a speed of about 25.77% of the speed at the equal magnification. This means that the zoom of the copy magnification of 388% is executed by the optical system. The CPU 116 sets the REDSET signal to 0 level and sets the MAGSET signal to 3 level. By setting the MAGSET signal to 3 level, the REQSEL signal is generated at the level such that 3→2→1→0→3→2→1→0 - - - synchronously with the BD signal when the image signal is read out from the memory 111. The DATAREQ signal is set to the H level only when the REQSEL signal is set to 0 level.

When the REQSEL signal is set to 0 level, the image signal of one line from the FIFO memory 303 is directly generated, the image signal in the FIFO memory 303 is stored into the FIFO memory 304, and the image signal of new one line is stored into the FIFO memory 303. Subsequently, when the REQSEL signal is not set to 0 level, the counting-up operation of the subscan address counter 115 is temporarily stopped. The sum of the signals which are obtained by respectively multiplying proper weights to the signals in the FIFO memories 303 and 304 in accordance with the value of the REQSEL signal is generated. That is, by forming the image signal between the lines by interpolating the image signal of two lines, the enlargement of 400% is realized. In this manner, the enlargement of 388% is executed by the optical system and the enlargement of 400% is executed upon generation from the memory 111, so that the enlargement of 1552% can be realized as a whole.

Subsequently, the memory zoom copy sequence is executed in step S213. After completion of the copying operation of one paper, "1" is subtracted from the number N of copy papers in step S214. The number of remaining copy papers is discriminated in step S215. When it is equal to 0, the copying operation is finished. When it is not equal to 0, the memory zoom copy sequence (S213) is again executed.

In the above fifth embodiment, the 2-bit counter 801 has been used in a reduction circuit 132 in order to realize the reduction of 12.5%. However, the image can be further reduced by using a counter of a larger number of bits. For instance, when a zoom in a range from 50 to 400% can be performed by only the optical system, the reduction of up to $100/2^{(n+1)}$% can be performed by using an n-bit counter in the reduction circuit 132. In case of the enlargement, contrarily, the image can be further enlarged by combining a multiple bit counter, an adder, a divider, and a selector in the enlargement circuit 137.

On the other hand, even in case of using an optical system which can perform a zoom in a range from 50 to 200%, by combining with a zoom circuit using a memory, a similar enlarging/reducing process can be realized. In this case, since a zoom range of the optical system driving motor is small, a burden on the motor can be reduced.

The sixth embodiment of the invention will now be described. In the above second to fifth embodiments, the zoom mode has been selected in accordance with the kind (color/monochrome) of original image or the zoom ratio. In the sixth embodiment, however, a zoom is performed by the optical system and memory 111 without performing the mode selection as mentioned above.

Figure 16:
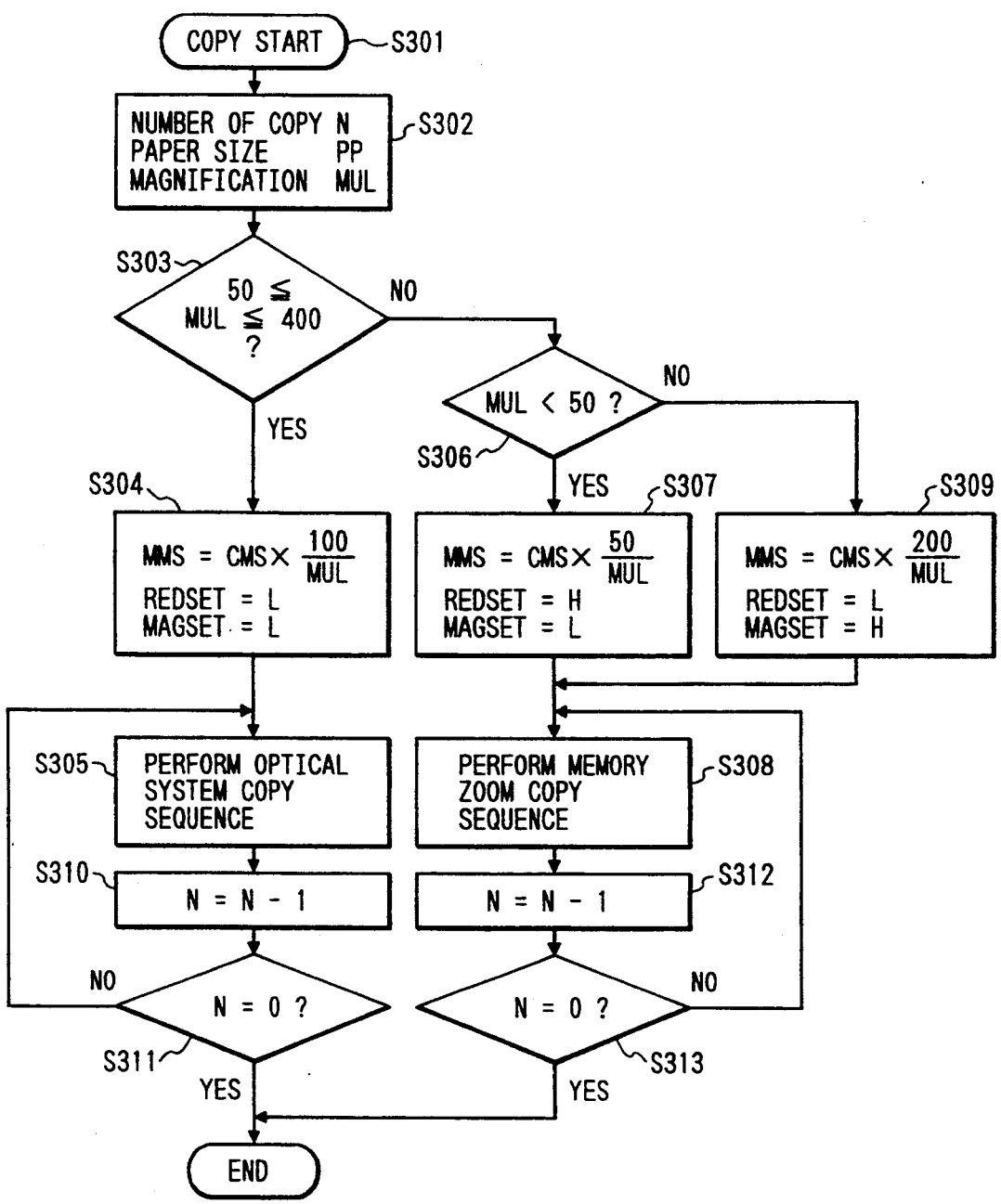
FIG. 16 is a flowchart showing the copying operation in the sixth embodiment of the invention.

FIG. 16 is a flowchart showing the copying operation in a copying machine of the sixth embodiment. It is assumed that a construction of the apparatus is similar to that in the second embodiment.

In the embodiment, a zoom in a range from 25 to 800% is realized by using the optical system driving motor which can perform a zoom in a range from 50 to 400%.

First, the copy magnification is set by the enlargement/reduction setting key 407 in the operation unit 51, the number of copy papers is set by the ten-key 404, and the paper size is set by the paper selecting key 401.

When the copy start key 406 is depressed (S301), the number N of copy papers, paper size PP, and copy magnification MUL are set into the CPU 116 (S302).

The copy magnification MUL is subsequently discriminated in step S303. When the copy magnification lies within a range from 50 to 400%, the initial value is set in step S304. In this instance, the speed MMS of the motor 15 is set to $$MMS = CMS \times 100/MUL$$

when the motor speed at the equal magnification of 100% is set to CMS. For example, when the copy magnification is set to 250%, the speed MMS of the motor 15 is equal to CMS×0.4 and the motor is driven at a speed of about 40% of the motor speed CMS at the equal magnification of 100%.

The CPU 116 sets the REDSET signal and the MAGSET signal to the L level. An optical system copy sequence (S305) similar to that in the second embodiment is subsequently executed. After completion of the copying operation of one paper, "1" is subtracted from the number N of copy papers in step S310. The number of remaining copy papers is discriminated in step S311. When it is equal to 0, the copying operation is finished. When it is not equal to 0, the optical system copy sequence (S305) is again executed.

When the copy magnification is less than 50% in step S303, the processing routine advances to step S307 through step S306 and the initialization is executed. In this instance, the speed MMS of the motor 15 is set to $$MMS = CMS \times 50/MUL.$$

For instance, when the copy magnification is set to 26%, the motor is driven at a speed of about 192.3% of the speed at the equal magnification. This means that the zoom of the copy magnification of 52% is executed by the optical system. The CPU 116 sets the REDSET signal to the H level and sets the MAGSET signal to the L level.

By setting the REDSET signal to the H level, the DATAVAL signal is alternately repetitively set to the H and L levels synchronously with the BD signal when the image signal is stored into the memory 111. When the DATAVAL signal is set to the L level, the counting-up operation of the subscan address counter 115 is temporarily stopped and the MWR signal is set to the L level, thereby stopping the storage of the image signal into the memory 111. By recording the image signal into the memory every other lines as mentioned above, the reduction of 50% in the memory 111 is realized. That is, the reduction of 52% is executed by the optical system and the reduction of 50% is executed in the memory 111, so that the reduction of 26% can be realized as a whole.

A memory zoom copy sequence similar to that in the second embodiment is subsequently executed in step S308. After completion of the copying operation of one paper, "1" is subtracted from the number N of copy papers in step S312. The number of remaining copy papers is discriminated in step S313. When it is equal to 0, the copying operation is finished. when it is not equal to 0, the memory zoom copy sequence (S308) is again executed.

When the copy magnification is larger than 400% in step S303, the processing routine advances to step S309 through step S306 and the initialization is executed. In this instance, the speed MMS of the motor 15 is set to $$MMS = CMS \times 200/MUL$$

For instance, when the copy magnification is set to 740%, the motor is driven at a speed of about 27% of the speed at the equal magnification. This means that the zoom of the copy magnification of 370% is executed by the optical system. The CPU 116 sets the REDSET signal to the L level and sets the MAGSET signal to the H level. By setting the MAGSET signal to the H level, the DATAREQ signal is alternately repetitively set to the H and L levels synchronously with the BD signal when the image signal is read out from the memory 111.

When the DATAREQ signal is set to the H level, the image signal of one line from the FIFO memory 303 is directly generated. The image signal in the FIFO memory 303 is stored into the FIFO memory 304 and the image signal of new one line is stored into the FIFO memory 303. Subsequently, when the DATAREQ signal is set to the L level, the counting-up operation of the subscan address counter 115 is temporarily stopped and the intermediate value of the image signals in the FIFO memories 303 and 304 is generated. That is, by forming the image signal between the lines by interpolating the image signal of two lines, the enlargement of 200% is realized. As mentioned above, the enlargement of 370% is executed by the optical system and the enlargement of 200% is executed upon generation from the memory 111, so that the enlargement of 740% can be realized as a whole.

The memory zoom copy sequence is subsequently executed in step S308. After completion of the copying operation of one paper, "1" is subtracted from the number N of copy papers in step S312. The number of remaining copy papers is discriminated in step S313. When it is equal to 0, the copying operation is finished. When it is not equal to 0, the memory zoom copy sequence (S308) is again executed.

The seventh embodiment of the invention will now be described.

Figure 17:
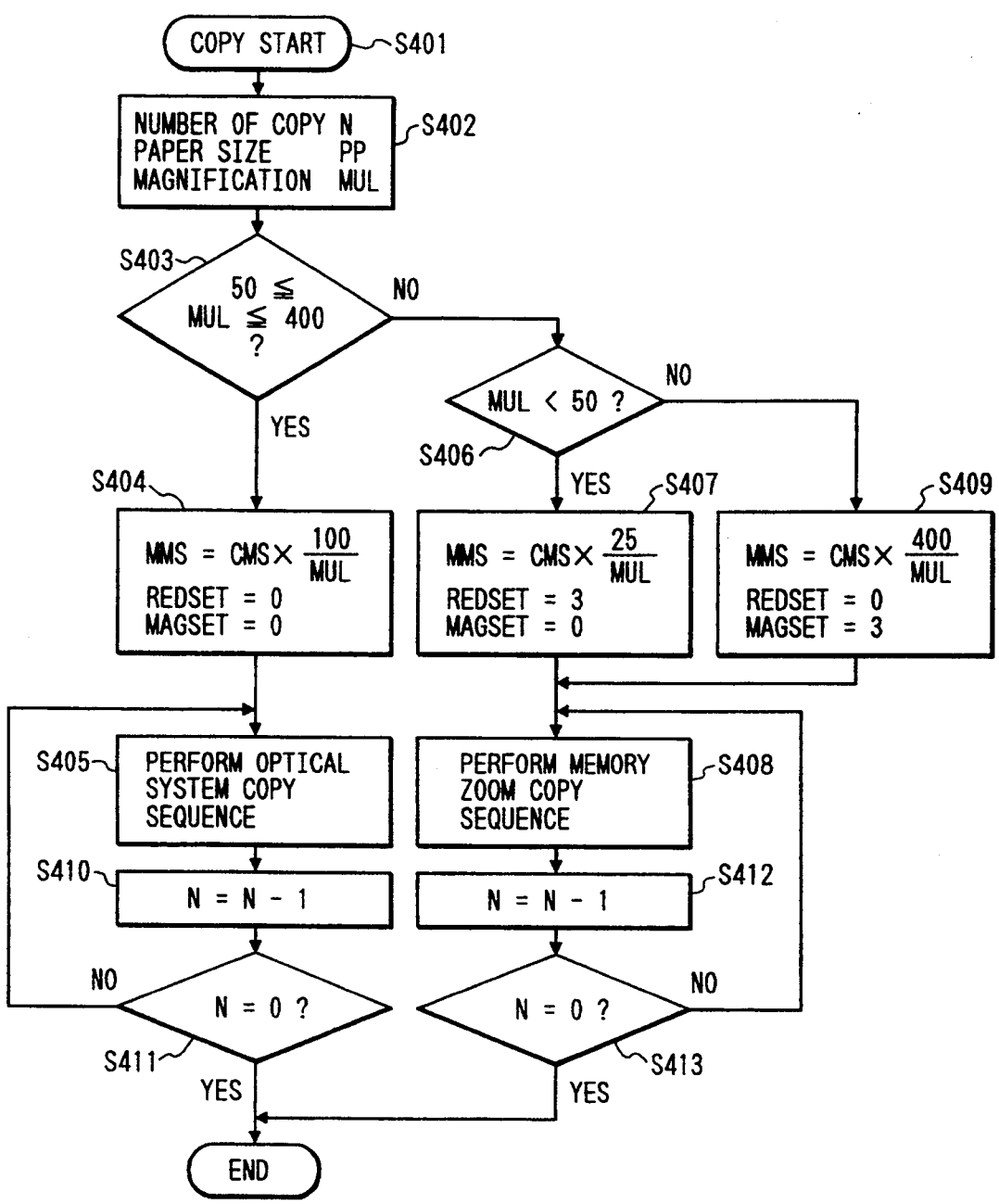
FIG. 17 is a flowchart showing the copying operation in the seventh embodiment of the invention.

FIG. 17 is a flowchart showing the copying operation in a copying machine in the seventh embodiment. It is now assumed that a construction of the apparatus is similar to that in the second embodiment.

In the seventh embodiment, a zoom in a range from 12.5 to 1600% is realized by using an optical system driving motor which can perform a zoom in a range from 50 to 400%.

First, the copy magnification is set by the enlargement/reduction setting key 407 in the operation unit 51, the number of copy papers is set by the ten-key 404, and the paper size is set by the paper selecting key 401. When the copy start key 406 is depressed (S401), the number N of copy papers, paper size PP, and copy magnification MUL are set into the CPU 116 (S402).

The copy magnification MUL is set in step S403. When the copy magnification lies within a range from 50 to 400%, the initial value is set in step S404. In this instance, the speed MMS of the motor 15 is set to $$MMS = CMS \times 100/MUL$$

when the motor speed at the equal magnification of 100% is set to CMS. The CPU 116 sets the REDSET signal and the MAGSET signal to 0 level.

An optical system copy sequence (S405) similar to that in the second embodiment is subsequently executed. After completion of the copying operation of one paper, "1" is subtracted from the number N of copy papers in step S410. The number of remaining copy papers is discriminated in step S411. When it is equal to 0, the copying operation is finished. When it is not equal to 0, the optical system copy sequence (S405) is again executed.

When the copy magnification is less than 50% in step S403, the processing routine advances to step S407 through step S406 and the initialization is performed. In this instance, the speed MMS of the motor 15 is set to $$MMS = CMS \times 25/MUL.$$

For example, when the copy magnification is set to 16%, the motor is driven at a speed of about 156.25% of the speed at the equal magnification. This means that the zoom of the copy magnification of 64% is executed by the optical system. The CPU 116 sets the REDSET signal to 3 level and sets the MAGSET signal to 0 level.

By setting the REDSET signal to 3 level, the DATAVAL signal is set to the H level once per four times of the L level synchronously with the BD signal when the image signal is stored into the memory 111. When the DATAVAL signal is set to the L level, the counting-up operation of the subscan address counter 115 is temporarily stopped and the MWR signal is set to the L level, thereby stopping the storage of the image signal into the memory 111. By storing the image signal into the memory 111 by one line per four lines as mentioned above, the reduction of 25% in the memory 111 is realized. That is, the reduction of 64% is executed by the optical system and the reduction of 25% is executed in the memory 111, so that the reduction of 16% can be realized as a whole.

A memory zoom copy sequence similar to that in the second embodiment is subsequently executed in step S408. After completion of the copying operation of one paper, "1" is subtracted from the number N of copy papers in step S412. The number of remaining copy papers is discriminated in step S413. When it is equal to 0, the copying operation is finished. When it is not equal to 0, the memory zoom copy sequence (S408) is again executed.

When the copy magnification is larger than 400% in step S403, the processing routine advances to step S409 through step S406 and the initialization is performed. In this instance, the speed MMS of the motor 15 is set to $$MMS = CMS \times 400/MUL.$$

For instance, when the copy magnification is set to 1552%, the motor 15 is driven at a speed of about 25.77% of the speed at the equal magnification. This means that the zoom of the copy magnification of 388% is executed by the optical system. The CPU 116 sets the REDSET signal to 0 level and sets the MAGSET signal to 3 level. By setting the MAGSET signal to 3 level, the REQSEL signal is generated at the levels such that 3→2→1→0→3→2→1→0 - - - synchronously with the BD signal when the image signal is read out from the memory 111. The DATAREQ signal is set to the H level only when the REQSEL signal is set to 0 level.

When the REQSEL signal is set to 0 level, the image signal of one line is directly generated from the FIFO memory 303, the image signal in the FIFO memory 303 is stored into the FIFO memory 304, and the image signal of new one line is stored into the FIFO memory 303. When the REQSEL signal is not set to 0 level, the counting-up operation of the subscan address counter 115 is temporarily stopped. The sum of the signals which are obtained by respectively multiplying proper weights to the signals in the FIFO memories 303 and 304 in accordance with the value of the REQSEL signal is generated. That is, by forming the image signal between the lines by interpolating the image signal of two lines, the enlargement of 400% is realized. As mentioned above, the enlargement of 388% is executed by the optical system and the enlargement of 400% is executed upon generation from the memory 111, so that the enlargement of 1552% can be realized as a whole.

The memory zoom copy sequence is subsequently executed in step S408. After completion of the copying operation of one paper, "1" is subtracted from the number N of copy papers in step S412. The number of remaining copy papers is discriminated in step S413. When it is equal to 0, the copying operation is finished. When it is not equal to 0, the memory zoom copy sequence (S408) is again executed.

In the above seventh embodiment, the 2-bit counter 801 has been used in the reduction circuit 132 in order to realize the reduction of 12.5%. However, the image can be further reduced by using a counter of a larger number of bits. For instance, when a zoom within a range from 50 to 400% can be performed by only by optical system, the reduction of up to $100/2^{(n+1)}\%$ can be performed by using an n-bit counter in the reduction circuit 132. In case of the enlargement, the image can be further enlarged by combining a multiple bit counter, an adder, a divider, and a selector in the enlargement circuit 137.

Even when an optical system which can perform a zoom in a range from 50 to 200% is used, a similar enlarging/reducing process can be executed by combining with a zoom circuit using a memory. In this case, since a zoom range of the optical system driving motor is small, a burden on the motor can be reduced.

Although the invention has been described above with respect to the preferred embodiments, the invention is not limited to the foregoing embodiments but many modifications and variations are possible within the spirit and scope of the appended claims of the invention.

What is claimed is:

1. An image reading apparatus for converting an original image on an original into a first image signal by a reading unit and for converting the first image signal into a second image signal, said apparatus comprising:
    input means for inputting a first zoom ratio;
    determining means for determining a second zoom ratio and a speed of said reading unit;
    driving means for driving said reading unit at the speed determined by said determining means so as to generate the first image signal indicative of a first image; and
    converting means for converting the first image signal generated from said reading unit into the second image signal indicative of a second image, in which the second image is an image obtained by zooming the first image at the second zoom ratio,
    wherein, in case of driving said reading unit at the determined speed and converting the first image signal according to the second zoom ratio, said determining means determines the second zoom ratio and the speed such that the second image can be obtained by zooming the original image at the first zoom ratio.

2. An apparatus according to claim 1, wherein said reading unit includes a line sensor, and
said driving means moves a reading position of the line sensor at the speed determined by said determining means.

3. An apparatus according to claim 1, wherein in the case where the zoom ratio supplied by said input means satisfies a predetermined condition, the second zoom ratio is an equal magnification, and when the zoom ratio supplied from the input means doesn't satisfy said predetermined condition, the second zoom ratio is a predetermined magnification other than the equal magnification.

4. An apparatus according to claim 1, wherein the first and second zoom ratios are magnifications other than an equal magnification.

5. An apparatus according to claim 1, wherein the second zoom ratio in a color image reading mode is different from the second zoom ratio in a monochrome image reading mode.

6. An apparatus according to claim 1, wherein said converting means has page memory means for storing the first image signal and enlarges the first image signal at the second zoom ratio when the first image signal is read out from the page memory means.

7. An apparatus according to claim 1, wherein said converting means converts the first image signal such that the first image is zoomed at the second zoom ratio in a driving direction of said reading unit.

8. An image reading apparatus for converting an original image on an original into a first image signal by a reading unit and for converting the first image signal into a second image signal, said apparatus comprising:
input means for inputting a first zoom ratio;
determining means for determining a speed of said reading unit;
converting means for converting the first image signal into the second image signal in accordance with a predetermined zoom ratio when the first zoom ratio does not satisfy a predetermined condition; and
driving means for driving the reading unit at the speed determined by said determining means when the first zoom ratio does not satisfy the predetermined condition,
wherein, in case of driving said reading unit at the determined speed and converting the first image signal according to the predetermined zoom ratio, said determining means determines the speed of said reading unit such that the second image can be obtained by zooming the original image at the first zoom ratio.

9. An apparatus according to claim 8, wherein when the zoom ratio supplied from the input means satisfies said predetermined condition, said converting means doesn't execute the conversion according to the predetermined zoom ratio, and said predetermined zoom ratio is a zoom ratio other than an equal magnification.

10. An apparatus according to claim 8, wherein said driving means drives the reading unit independent from the predetermined zoom ratio when the first zoom ratio satisfies the predetermined condition.

11. An apparatus according to claim 8, wherein said converting means converts the first image signal such that an image represented by the first image signal is zoomed at the predetermined ratio in a driving direction of said reading unit.

12. An image magnification method in an image reading apparatus having a reading unit to read an original image on an original, comprising the steps of:
inputting a first magnification ratio;
determining a second magnification ratio and a speed of the reading unit;
driving the reading unit at the speed determined in said determining step; and
converting an image signal generated by the reading unit such that an image represented by the image signal is magnified in accordance with the second magnification ratio,
wherein, in said determining step, in case of driving the reading unit at the determined speed and converting the image signal according to the second magnification ratio, the second magnification ratio and the speed are determined such that the image can be obtained by magnifying the original image at the input first magnification ratio.

13. A method according to claim 12, wherein the first and second magnification ratios are unequal magnifications.

14. A method according to claim 12, wherein the second magnification ratio is an equal magnification if the input first magnification ratio is within a predetermined range, and the second magnification ratio is an unequal magnification if the input first magnification ratio is out of the predetermined range.

15. A method according to claim 14, wherein the predetermined range in a color mode for reading a color original is different in a monochrome mode for reading a monochrome original.

16. A method according to claim 12, wherein, in said converting step, the image signal is converted such that the image represented by the image signal is magnified at the second magnification ratio in a driving direction of the reading unit.

17. A method according to claim 12, wherein the image represented by the image signal converted in said converting step is an image obtained by magnifying the original image at the input first magnification ratio.

18. A method according to claim 12, wherein, in said converting step, the image signal generated by the reading unit is thinned out.

19. A method according to claim 12, wherein, in said converting step, the image signal generated by the reading unit is enlarged when the image signal is read out of a page memory for storing the image signal.

* * * * *

UNITED STATES PATENT AND TRADEMARK OFFICE
CERTIFICATE OF CORRECTION

PATENT NO. : 5,398,117
DATED : March 14, 1995
INVENTOR(S) : AKIO SUZUKI, ET AL.

Page 1 of 2

It is certified that error appears in the above-identified patent and that said Letters Patent is hereby corrected as shown below:

ON TITLE PAGE

Under *Attorney, Agent, or Firm*, "Fitzpatrick, Cella Harper & Scinto" should read --Fitzpatrick, Cella, Harper & Scinto--.

COLUMN 3

Line 32, "diagrams" should read --diagram--.

COLUMN 5

Line 62, "one" should be deleted.

COLUMN 14

Line 20, "driection" should read --direction--.
Line 40, "motro 15" should read --motor 15--.

COLUMN 15

Line 14, "discirminating" should read --discriminating--.

COLUMN 19

Line 41, "hte" should read --the--.

UNITED STATES PATENT AND TRADEMARK OFFICE
CERTIFICATE OF CORRECTION

PATENT NO. : 5,398,117
DATED : March 14, 1995
INVENTOR(S) : AKIO SUZUKI, ET AL.

It is certified that error appears in the above-identified patent and that said Letters Patent is hereby corrected as shown below:

COLUMN 28

Line 28, "by only" should read --only--.

Signed and Sealed this

Twentieth Day of June, 1995

Attest:

BRUCE LEHMAN

Attesting Officer     Commissioner of Patents and Trademarks